US012512255B2

(12) United States Patent
Yoshioka

(10) Patent No.: US 12,512,255 B2
(45) Date of Patent: Dec. 30, 2025

(54) INDUCTOR COMPONENT AND RESIN SEALING BODY

(71) Applicant: Murata Manufacturing Co., Ltd., Kyoto-fu (JP)

(72) Inventor: Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1014 days.

(21) Appl. No.: 17/174,174

(22) Filed: Feb. 11, 2021

(65) Prior Publication Data

US 2021/0265102 A1 Aug. 26, 2021

(30) Foreign Application Priority Data

Feb. 26, 2020 (JP) ................................ 2020-030654

(51) Int. Cl.
*H01F 27/29* (2006.01)
*H01F 27/245* (2006.01)
*H01F 27/28* (2006.01)
*H01F 27/32* (2006.01)
*H01F 41/02* (2006.01)
*H01F 41/06* (2016.01)

(52) U.S. Cl.
CPC ....... *H01F 27/2828* (2013.01); *H01F 27/245* (2013.01); *H01F 27/29* (2013.01); *H01F 27/32* (2013.01); *H01F 41/0233* (2013.01); *H01F 41/06* (2013.01)

(58) Field of Classification Search
CPC .... H01F 27/2828; H01F 27/245; H01F 27/29; H01F 27/32; H01F 41/0233; H01F 41/06; H01F 41/046; H01F 27/292; H01F 2017/0066; H01F 17/0006; H01L 28/10; H01L 23/5227
See application file for complete search history.

(56) References Cited

U.S. PATENT DOCUMENTS

| | | | | |
|---|---|---|---|---|
| 2004/0145442 | A1* | 7/2004 | Matsutani | H01F 27/292 336/200 |
| 2014/0009254 | A1 | 1/2014 | Ohkubo et al. | |
| 2018/0075965 | A1* | 3/2018 | Yoshioka | H01F 27/2823 |
| 2020/0105456 | A1* | 4/2020 | Kim | H01F 27/292 |

FOREIGN PATENT DOCUMENTS

| | | | | | |
|---|---|---|---|---|---|
| JP | 2013-239649 | A | | 11/2013 | |
| JP | 6024243 | B2 | | 11/2016 | |
| JP | 2017069523 | A | * | 4/2017 | G06F 1/1635 |
| JP | 2018046051 | A | * | 3/2018 | H01F 17/0006 |
| WO | 2017/179590 | A1 | | 10/2017 | |

* cited by examiner

*Primary Examiner* — Mang Tin Bik Lian
(74) *Attorney, Agent, or Firm* — Studebaker Brackett PLLC

(57) ABSTRACT

An inductor component includes a main body including a magnetic layer, an inductor wire provided in the main body, at least one first electrode wire provided in the main body and in contact with the inductor wire and extending from its contact portion toward a first main surface of the main body, and at least one second electrode wire provided in the main body and in contact with the inductor wire and extending from its contact portion toward a second main surface of the main body. A first external terminal of the at least one first electrode wire contains a metal material different from a metal material contained in a second external terminal of the at least one second electrode wire.

19 Claims, 12 Drawing Sheets

INDUCTOR COMPONENT AND RESIN SEALING BODY

CROSS-REFERENCE TO RELATED APPLICATION

This application claims benefit of priority to Japanese Patent Application No. 2020-030654, filed Feb. 26, 2020, the entire content of which is incorporated herein by reference.

BACKGROUND

Technical Field

The present disclosure relates to inductor components and resin sealing bodies.

Background Art

The inductor component described in Japanese Patent No. 6024243 includes a main body having a magnetic layer, and a spiral conductor. The spiral conductor is provided in the main body. The main body has a first main surface and a second main surface positioned opposite to the first main surface across the spiral conductor. Also, the inductor component includes two vertical wires in contact with a portion of contact with the spiral conductor. Of these two vertical wires, a first vertical wire extends from the portion of contact with the spiral conductor toward the first main surface, and a second vertical wire extends from the portion of contact with the spiral conductor toward the second main surface. The first vertical wire is connected to a first external terminal provided on the first main surface, and the second vertical wire is connected to a second external terminal provided on the second main surface.

SUMMARY

In the above-described inductor component configured to include the wire extending from the inductor conductor toward the first main surface and the wire extending from the inductor conductor toward the second main surface, further improvements in design flexibility are desired.

According to preferred embodiments of the present disclosure, an inductor component includes a main body including a magnetic layer and having a first main surface and a second main surface; an inductor wire provided in the main body; at least one first electrode wire provided in the main body and in contact with the inductor wire and extending from a portion of contact with the inductor wire toward the first main surface; and at least one second electrode wire provided in the main body and in contact with the inductor wire and extending from a portion of contact with the inductor wire toward the second main surface. The second main surface is positioned opposite to the first main surface across the inductor wire. In each of the at least one first electrode wire and the at least one second electrode wire, when an end portion opposite to an end portion in contact with the inductor wire is taken as an external terminal, the external terminal is exposed outside, and the external terminal of the at least one first electrode wire contains a metal material different from a metal material contained in the external terminal of the at least one second electrode wire.

As for the external terminal, its appropriate structure and material may vary in accordance with the purpose of use. In this regard, in the above-described structure, the external terminal of the first electrode wire is configured to contain a metal material not contained in the external terminal of the second electrode wire. This can enhance flexibility in designing the inductor component including the first electrode wire extending from the inductor wire toward the first main surface and the second electrode wire extending from the inductor wire toward the second main surface.

According to preferred embodiments of the present disclosure, a resin sealing body includes the inductor component and a sealing resin which seals the inductor component.

According to the above-described structure, flexibility in designing the resin sealing body can be enhanced.

Other features, elements, characteristics and advantages of the present disclosure will become more apparent from the following detailed description of preferred embodiments of the present disclosure with reference to the attached drawings.

DETAILED DESCRIPTION

First Embodiment

Figure 1:
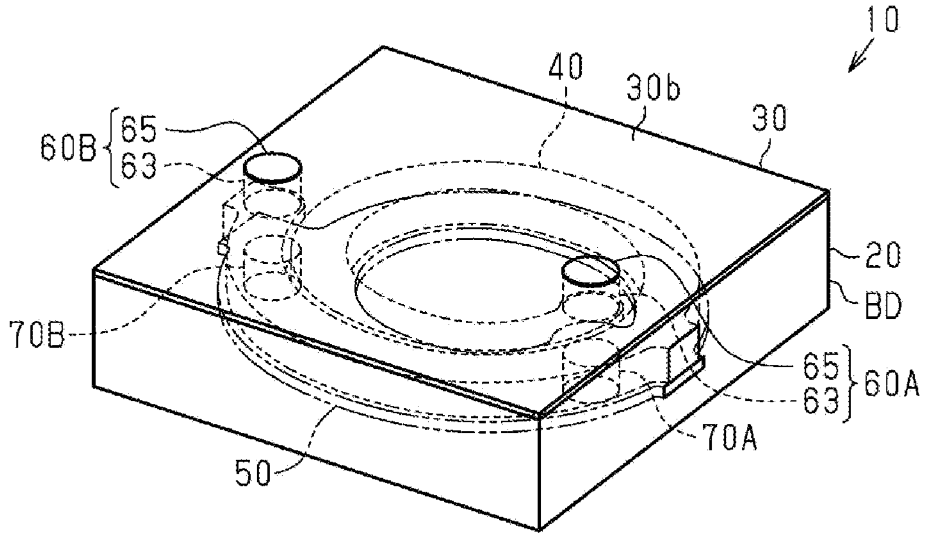
FIG. 1 is a perspective view schematically depicting a first embodiment of an inductor component.

In the following, one embodiment of the inductor component is described in accordance with FIG. 1 to FIG. 21. Note that components may be displayed in the drawings as being enlarged for ease of understanding. The dimensional ratio of each component may be different from the actual dimensional ratio or the dimensional ratio in other drawings. Also, in sectional views, hatching is provided but hatching of some components may be omitted for ease of understanding.

As depicted in FIG. 1, a main body BD of an inductor component 10 includes a magnetic layer 20 configured of a magnetic material. The magnetic layer 20 is configured of, for example, a resin containing metal magnetic powder. When the magnetic layer 20 is configured of the resin containing metal magnetic powder, examples of metal magnetic powder include those made of iron, nickel, chrome, copper, aluminum, and alloys thereof. Also, examples of the resin containing metal magnetic powder include resin materials such as an epoxy resin. In consideration of insulation properties and formability, a polyimide resin, an acrylic resin, or a phenol resin is preferably adopted as the resin. In the magnetic layer 20, approximately 60 wt % or more of metal magnetic powder is preferably contained with respect to the total weight. Also, to enhance filling ability of the resin containing metal magnetic powder, it is further preferable to make two or three types of metal magnetic powder with different granular variations contained in resin.

The magnetic layer 20 may be configured of a resin containing ferrite powder in place of metal magnetic powder, or may be configured of a resin containing both metal magnetic powder and ferrite powder. Also, for example, the magnetic layer 20 may be a substrate formed by solidifying ferrite powder sintering, that is, a ferrite sintered body.

Figure 3:
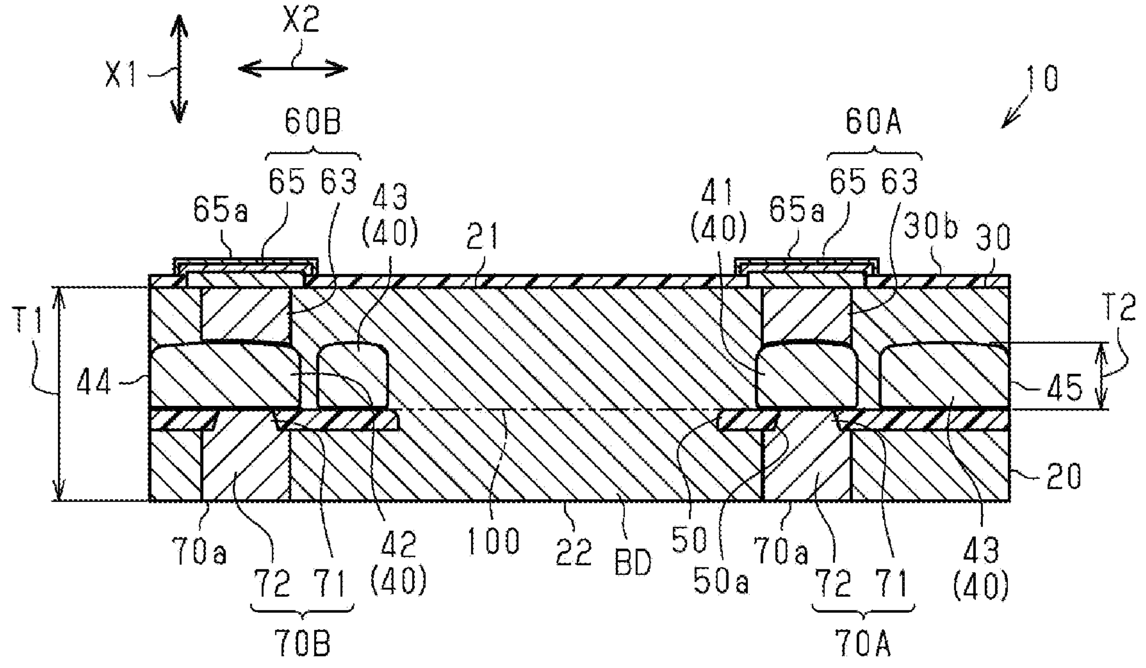
FIG. 3 is a sectional view of the inductor component.

In the example depicted in FIG. 1, the main body BD has a substantially rectangular parallelepiped shape. The shape of the main body BD is not limited to a substantially rectangular parallelepiped shape, but may be, for example, a substantially columnar or polygonal shape. Of the side surfaces of the main body BD, the upper surface in FIG. 3 is referred to as a “first main surface 21”. Also, of the side surfaces of the main body BD, a main surface positioned opposite to the first main surface 21 across an inductor wire 40 described further below is referred to as a “second main surface 22”.

As depicted in FIG. 3, when a dimension of the main body BD in a direction in which the first main surface 21 and the second main surface 22 are aligned is taken as a thickness T1 of the main body BD, the thickness T1 of the main body BD is approximately 0.15 mm or more and approximately 0.3 mm or less (i.e., from approximately 0.15 mm to approximately 0.3 mm). That is, a distance between the first main surface 21 and the second main surface 22 is approximately 0.15 mm or more and approximately 0.3 mm or less (i.e., from approximately 0.15 mm to approximately 0.3 mm). Thus, the inductor component 10 is very thin.

As depicted in FIG. 1 and FIG. 3, the inductor component 10 includes a surface layer 30 with insulation properties positioned on the first main surface 21 of the main body BD. The surface layer 30 has a thickness thinner than the thickness T1 of the main body BD. The surface layer 30 is configured of a resin. Examples of the resin configuring the surface layer 30 include a polyimide resin, an epoxy resin, a phenol resin, and a liquid-crystal polymer. Also, the surface layer 30 may be configured of a mixture of at least two of a polyimide resin, an epoxy resin, a phenol resin, and a liquid-crystal polymer. Furthermore, to enhance insulation performance of the surface layer 30, the surface layer 30 may contain an insulating filler such as a silica filler. However, the surface layer 30 does not contain magnetic powder.

The inductor component 10 includes the inductor wire 40 provided in the main body BD and an insulating layer 50 positioned in the main body BD and in contact with the inductor wire 40. The insulating layer 50 is arranged opposite to the first main surface 21 across the inductor wire 40.

The insulating layer 50 is a non-magnetic body. The insulating layer 50 has insulation properties higher than the insulation properties of the magnetic layer 20. The insulating layer 50 includes, for example, a polyimide resin, an acrylic resin, an epoxy resin, a phenol resin, and/or a liquid-crystal polymer. To enhance insulation performance of the insulating layer 50, the insulating layer 50 may contain an insulating filler such as a silica filler. The non-magnetic body in the present embodiment has a resistivity of approximately 1 MΩ·cm or more.

The inductor component 10 includes first electrode wires in contact with the inductor wire 40 and second electrode wires in contact with the inductor wire 40. As the first electrode wires, the inductor component 10 includes a first electrode wire 60A and a first electrode wire 60B. A portion of the inductor wire 40 in contact with the first electrode wire 60A is different from a portion of the inductor wire 40 in contact with the first electrode wire 60B.

As second electrode wires, the inductor component 10 includes a second electrode wire 70A and a second electrode wire 70B. A portion of the inductor wire 40 in contact with the second electrode wire 70A is different from a portion of the inductor wire 40 in contact with the second electrode wire 70B.

Next, the inductor wire 40 is described.

Figure 4:
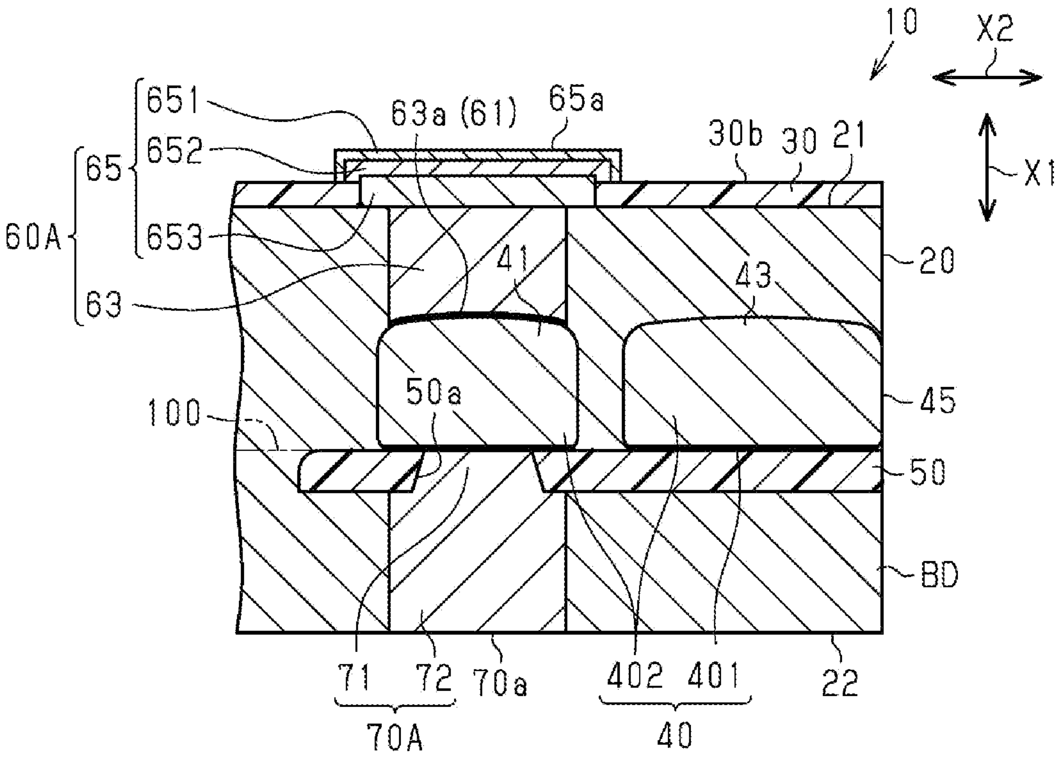
FIG. 4 is a partially-enlarged sectional view of the inductor component.

The inductor wire 40 is configured of a conductive material. The inductor wire 40 contains, as the conductive material, at least one of, for example, copper, silver, gold, and aluminum. Also, for example, the inductor wire 40 may contain, as the conductive material, an alloy of at least two of copper, silver, gold, and aluminum. In the present embodiment, as depicted in FIG. 4, the inductor wire 40 includes a wiring seed layer 401, which is a seed layer in contact with the insulating layer 50, and a conductive layer 402 positioned opposite to the insulating layer 50 across the wiring seed layer 401. The wiring seed layer 401 contains copper as one example of a conductive material. When the dimension of the wiring seed layer 401 in a direction in which the first main surface 21 and the second main surface 22 are aligned is taken as the thickness of the wiring seed layer 401, the thickness of the wiring seed layer 401 is approximately 30 nm or more and approximately 500 nm or less (i.e., from approximately 30 nm to approximately 500 nm). The conductive layer 402 contains, for example, copper and sulfur. When the conductive layer 402 contains copper and sulfur as described above, for example, in the conductive layer 402, the ratio of copper may be approximately 99 wt % or more, and the ratio of sulfur may be approximately 0.1 wt % or more and less than approximately 1.0 wt % (i.e., from approximately 0.1 wt % to approximately 1.0 wt %). The inductor wire 40 may be configured not to include the wiring seed layer 401.

When the dimension of the inductor wire 40 in a direction in which the first main surface 21 and the second main surface 22 are aligned is taken as a thickness T2 of the inductor wire 40, the thickness T2 of the inductor wire 40 is approximately 40 μm or more and approximately 55 μm or less (i.e., from approximately 40 μm to approximately 55 μm).

The wiring seed layer 401 may be configured to include, as a layer, at least one of a layer containing titanium and a layer containing tungsten. With the wiring seed layer 401 formed in a multilayer structure as described above, a close contact between the inductor wire 40 and the insulating layer 50 can be further enhanced.

Figure 2:
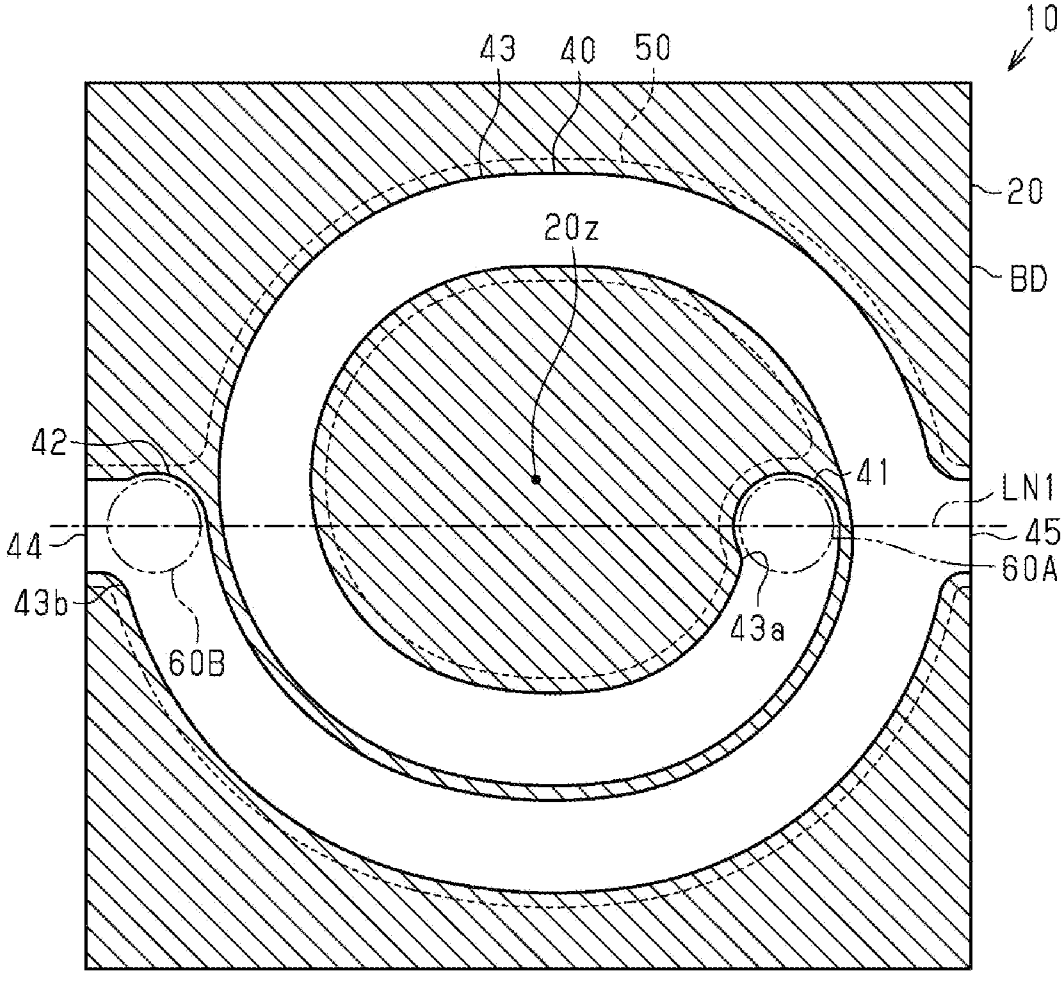
FIG. 2 is a sectional view for describing the shape of an inductor wire of the inductor component.

As depicted in FIG. 2 and FIG. 3, the inductor wire 40 is provided along a predetermined plane 100 in the main body BD. The predetermined plane 100 is a virtual plane formed by a portion in surface contact with the inductor wire 40 in the insulating layer 50. While the predetermined plane 100 is parallel to the first main surface 21 in the present embodiment, a virtual plane not parallel to the first main surface 21 may be taken as the predetermined plane 100. FIG. 3 is a sectional view of the inductor component 10 cut out along a direction orthogonal to a line LN1 indicated by a one-dot-chain line in FIG. 2.

The inductor wire 40 has a first pad 41, a second pad 42, and a wire main body 43 linking the first pad 41 and the second pad 42 together. As depicted in FIG. 3 and FIG. 4, the first electrode wire 60A and the second electrode wire 70A are in contact with the first pad 41. Also, the first electrode wire 60B and the second electrode wire 70B are in contact with the second pad 42. That is, an upper portion of the first pad 41 in the drawings serves as a portion of contact between the inductor wire 40 and the first electrode wire 60A, and a lower portion of the first pad 41 in the drawings serves as a portion of contact between the inductor wire 40 and the second electrode wire 70A. Also, an upper portion of the second pad 42 in the drawings serves as a portion of contact between the inductor wire 40 and the first electrode wire 60B, and a lower portion of the second pad 42 in the drawings serves as a portion of contact between the inductor wire 40 and the second electrode wire 70B.

FIG. 4 is a partially-enlarged view of FIG. 3. In FIG. 4, a cross section of the first pad 41 orthogonal to a direction in which the inductor wire 40 extends from the first pad 41 as a first end portion of the inductor wire 40. Here, of directions along the cross section, the vertical direction in the drawing in which the first main surface 21 and the second main surface 22 are aligned is referred to as a thickness direction X1 of the inductor wire 40. Also, of the directions along the cross section, a direction orthogonal to the thickness direction X1 is referred to as a width direction X2 of the inductor wire 40. The width direction X2 is also a direction along the predetermined plane 100.

The wire main body 43 forms a substantially spiral shape centering at a center axis 20*z* of the main body BD on the predetermined plane 100. Specifically, when viewed from top, the wire main body 43 is wound in a substantially spiral shape from an outer peripheral end portion 43*b* on an outer side portion in a radial direction toward an inner peripheral end portion 43*a* on an inner side portion in the radial direction.

Here, the number of turns of the inductor wire is defined based on a virtual vector. The starting point of the virtual vector is arranged on a virtual center line passing though the center of the wire width of the inductor wire and extending to the extending direction of the inductor wire. The virtual vector is in contact with the virtual center line extending to the extending direction of the inductor wire when viewed from the thickness direction X1. When the starting point of the virtual vector arranged at one end of the virtual center line is moved to the other end of the virtual center line, if the orientation of the virtual vector is rotated by an angle of 360°, the number of turns is defined as 1.0 turn. Therefore, for example, if the inductor wire is wound by 180°, the number of turns is 0.5 turns.

In the present embodiment, the orientation of a virtual vector virtually arranged on the wire main body 43 of the inductor wire 40 is rotated by 540°. Thus, in the present embodiment, the number of turns at which the wire main body 43 is wound is 1.5 turns.

The second pad 42 has connected thereto the outer peripheral end portion 43*b* of the wire main body 43. The second pad 42 has connected thereto a first dummy wire 44 extending along the predetermined plane 100 toward an outer edge side of the main body BD. The first dummy wire 44 is exposed outside the inductor component 10. As with the wire main body 43 and the second pad 42, the first pad 41 is arranged on the predetermined plane 100. The first pad 41 has connected thereto the inner peripheral end portion 43*a* of the wire main body 43.

In a portion between the outer peripheral end portion 43*b* and the inner peripheral end portion 43*a* of the wire main body 43, a second dummy wire 45 extending toward an outer edge side of the main body BD along the predetermined plane 100 is connected at a location reached by winding of 0.5 turns from the outer peripheral end portion 43*b*. The second dummy wire 45 is exposed outside the inductor component 10.

Here, only the inductor wire 40 positioned on the predetermined plane 100 is the inductor wire provided in the main body BD. That is, no inductor wire is provided on a virtual plane positioned between the upper surface of the inductor wire 40 and the first main surface 21 and on a virtual plane positioned between the predetermined plane 100 and the second main surface 22 in FIG. 3. In other words, only the inductor wire 40 arranged on the predetermined plane 100 is the inductor wire provided in the main body BD. Thus, in the inductor component 10 of the present embodiment, it can be said that the number of inductor wire layers is merely one. When the number of inductor wire layers is merely one, at least one of the first electrode wire 60A and the second electrode wire 70A is in contact with the first pad 41 as a first end of the inductor wire 40, and at least one of the first electrode wire 60B and the second electrode wire 70B is in contact with the second pad 42 as a second end of the inductor wire 40. Specifically, in the inductor component 10 of the present embodiment, the first electrode wire 60A and the second electrode wire 70A are in contact with the first pad 41, and the first electrode wire 60B and the second electrode wire 70B are in contact with the second pad 42.

Next, the second electrode wires 70A and 70B are described.

As depicted in FIG. 3 and FIG. 4, in the insulating layer 50, a via hole 50*a* as a through hole is provided at each of a portion in contact with the first pad 41 and a portion in contact with the second pad 42 of the inductor wire 40. The second electrode wire 70A penetrates through the via hole 50*a* to be in contact with the first pad 41, and the second electrode wire 70B penetrates through the via hole 50*a* to be in contact with the second pad 42.

Each of the second electrode wires 70A and 70B has a via 71 and a second columnar wire 72. The via 71 is positioned in the via hole 50*a* and in contact with the inductor wire 40. That is, the via 71 penetrates through the insulating layer 50 in the thickness direction X1. The second columnar wire 72 is connected to one end of the via 71 opposite to the other end thereof in contact with the inductor wire 40. The second columnar wire 72 extends in one direction and penetrates through the magnetic layer 20. Of both ends of the second columnar wire 72, one end opposite to the other end in contact with the inductor wire 40, that is, one end opposite to the other end in contact with the via 71, serves as a second external terminal 70*a*. In the present embodiment, the second external terminal 70*a* is flush with the second main surface 22 of the main body BD, and is exposed outside the inductor wire 40.

Each of the second electrode wires 70A and 70B contains copper and sulfur. That is, the ratio of copper in each of the second electrode wires 70A and 70B is approximately 99 wt % or more, and the ratio of sulfur in each of the second electrode wires 70A and 70B is approximately 0.1 wt % or more and less than approximately 1.0 wt % (i.e., from approximately 0.1 wt % to approximately 1.0 wt %). In the present embodiment, since part of each of the second electrode wires 70A and 70B is the second external terminal 70*a*, it can be said that the second external terminal 70*a* contains copper and sulfur.

Next, the first electrode wires 60A and 60B are described.

As depicted in FIG. 3 and FIG. 4, each of the first electrode wires 60A and 60B includes a first columnar wire 63 extending from a portion of contact with the inductor wire 40 toward the first main surface 21 and a first external terminal 65, which is one end portion of the first columnar wire 63 opposite to the other end portion thereof in contact with the inductor wire 40. The first external terminal 65 is connected to one end portion of the first columnar wire 63 opposite to the other end portion thereof in contact with the inductor wire 40. The first external terminal 65 is exposed outside the inductor wire 40. If a wire connecting the inductor wire 40 and the first external terminal 65 is defined as a vertical wire, the first columnar wire 63 corresponds to the vertical wire in the present embodiment.

In the first columnar wire 63, a portion of contact 63*a* with the inductor wire 40 is configured of a seed layer 61. In the present embodiment, the seed layer 61, which is part of the first columnar wire 63, is referred to as a "columnar-wire seed layer 61".

The columnar-wire seed layer 61 contains copper as one example of a conductive material. The columnar-wire seed layer 61 is a multilayer body with a plurality of layers laminated. The columnar-wire seed layer 61 includes, as a layer, a layer in which the ratio of copper is approximately 90 wt % or more. Also, the columnar-wire seed layer 61 includes, as a layer, a layer containing palladium. Of the plurality of layers, the layer containing palladium is in contact with the inductor wire 40.

The columnar-wire seed layer 61 has, as layers, a layer containing titanium and a layer containing tungsten. With the columnar-wire seed layer 61 formed in a multilayer structure as described above, a close contact between the first columnar wire 63 and the inductor wire 40 can be enhanced. The columnar-wire seed layer 61 may not have a layer containing titanium. Also, the columnar-wire seed layer 61 may not have a layer containing a tungsten.

The first external terminal 65 protrudes from the first main surface 21 of the main body BD. More specifically, the first external terminal 65 protrudes also from the surface layer 30. That is, in the thickness direction X1 of the main body BD, an exposed end face 65*a* of the first external terminal 65 is positioned outside a front surface 30*b* of the surface layer 30.

The first external terminal 65 contains a metal material different from the metal materials contained in the second external terminal 70*a*, that is, a metal material not contained in the second external terminal 70*a*. Specifically, the first external terminal 65 is a multilayer body with a plurality of layers laminated, including a layer containing a metal material not contained in the second external terminal 70*a*. The first external terminal 65 may not be a multilayer body as long as the first external terminal 65 contains a metal material not contained in the second external terminal 70*a* and is configured of conductive materials of a plurality of types including the metal material.

In the example depicted in FIG. 3 and FIG. 4, the first external terminal 65 is a multilayer body with three layers 651, 652, and 653 laminated. The multilayer body contains, for example, at least one metal among copper, nickel, gold, and tin. Also, for example, the multilayer body may contain an alloy made of at least two of copper, nickel, gold, and tin.

For example, of the plurality of layers 651 to 653 configuring the first external terminal 65, the outermost layer 651 is a parent solder layer which improves wettability. The parent solder layer preferably contains gold, tin, or the like. Also, the parent solder layer may contain at least one of an alloy containing gold and an alloy containing tin.

The outermost layer 651 may be a layer that inhibits oxidation of the first external terminal 65.

Also, for example, the layer 652 positioned between the layer 651 and the layer 653 may be a corrosion inhibiting layer. The corrosion inhibiting layer preferably contains nickel, for example. Also, the corrosion inhibiting layer may contain an alloy containing nickel.

Also, for example, the layer 653 is a layer that seeks an improvement in conductivity. A layer of this type preferably contains copper or the like. Also, that layer may contain an alloy containing copper.

Next, the operation and effects of the present embodiment are described.

(1) The external terminals may have different appropriate structures and materials in accordance with their use purposes. Regarding this, in the present embodiment, the first external terminal 65 is configured to contain a metal not contained in the second external terminal 70*a*. Thus, the component material of the first external terminal 65 and the component material of the second external terminal 70*a* can be determined in accordance with the use purpose and the implementation mode of the inductor component 10. Therefore, flexibility in designing the inductor component 10 can be improved.

(2) Also in the present embodiment, when the inductor component 10 is mounted, if connection by using the first external terminal 65 is preferable to connection by using the second external terminal 70*a*, energization can be performed from the first external terminal 65. Conversely, if connection by using the second external terminal 70*a* is preferable to connection by using the first external terminal 65, energization can be performed from the second external terminal 70*a*.

For example, consider a case in which flexibility in arranging a wiring pattern varies between the front surface and the back surface of a printed wiring board where the inductor component 10 is to be mounted. In this case, one of the first external terminal 65 and the second external terminal 70*a* with which a wiring pattern and continuity are easily achieved is selected. Therefore, flexibility in mounting the inductor component 10 can also be enhanced.

(3) The multilayer body configuring the first external terminal 65 has a corrosion inhibiting layer. This can enhance an effect of inhibiting electrochemical migration.

Also, when the layer 651 of the multilayer body configuring the first external terminal 65 is an oxidation inhibiting layer, oxidation of the first external terminal 65 can be inhibited.

Also, when the layer 651 of the multilayer body configuring the first external terminal 65 is a parent solder layer and the inductor component 10 is attached to a circuit board by using soldering, an occurrence of a failure in contact between the first external terminal 65 and a terminal of the circuit board can be inhibited.

(4) The first external terminal 65 protrudes from the surface layer 30. This allows a pin for measurement to easily make contact with the first external terminal 65 when evaluating various performances of the inductor component 10 by making the pin contact with the first external terminal 65.

(5) The end portion of the second columnar wire 72 is the second external terminal 70*a*. Thus, compared with the case in which a member different from the second columnar wire 72 is provided as a second external terminal, complication in the structure of the second electrode wires 70A and 70B can be inhibited. Also, an increase of the second electrode wire 70A in the dimension in the thickness direction X1 can be inhibited. Furthermore, compared with the case in which a member different from the second columnar wire 72 is provided as a second external terminal, an increase in the number of steps when manufacturing the inductor component 10 can be inhibited.

(6) When the thickness T1 of the main body BD is less than approximately 0.15 mm, the inductor component 10 is too thin and may be warped. On the other hand, when the thickness T1 is more than approximately 0.3 mm, flexibility in mounting the inductor component 10 may be decreased. Regarding this, in the present embodiment, the thickness T1 is approximately 0.15 mm or more and approximately 0.3 mm or less (i.e., from approximately 0.15 mm to approximately 0.3 mm). Thus, while sufficient strength is ensured as the inductor component 10, a decrease in flexibility in mounting the inductor component 10 can be inhibited.

(7) When the thickness T2 of the inductor wire 40 is less than approximately 40 μm, the aspect ratio of the inductor wire 40 is too small, and the wire resistance of the inductor wire 40 may be increased. On the other hand, when the thickness T2 is more than approximately 55 μm, the force of pressing the inductor wire 40 in the width direction X2 is increased, and the position of the inductor wire 40 may be deviated from a predetermined designed position. The designed position means the position of the inductor wire 40 determined in designing the inductor component 10. Regarding this, in the present embodiment, the thickness T2 is approximately 40 μm or more and approximately 55 μm or less (i.e., from approximately 40 μm to approximately 55 μm). Thus, while an increase in wire resistance of the inductor wire 40 is inhibited, deviation of the position of the inductor wire 40 from the designed position can be inhibited.

Next, with reference to FIG. 5 to FIG. 21, one example of a method of manufacturing the above-described inductor component 10 is described. The manufacturing method in the present embodiment is a method using a semi-additive method.

Figure 5:
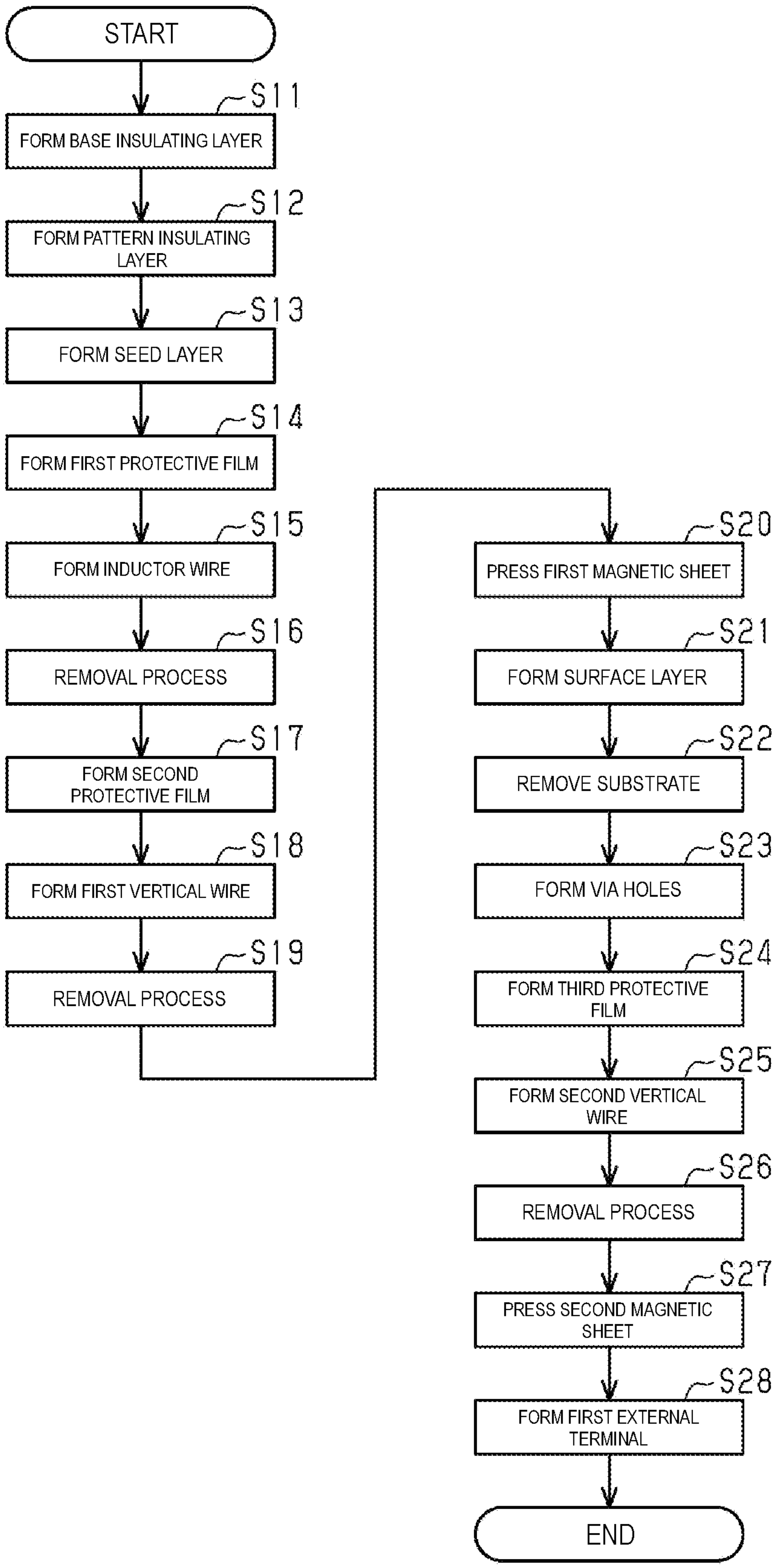
FIG. 5 is a flowchart for describing one example of a method of manufacturing the inductor component.
Figure 6:
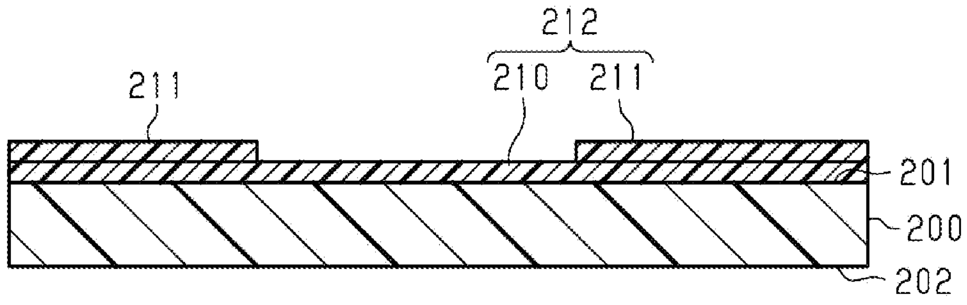
FIG. 6 is a descriptive diagram of the manufacturing method.

As depicted in FIG. 5, at the initial step S11, a base insulating layer 210 is formed on a substrate 200. As depicted in FIG. 6, the substrate 200 forms a substantially plate shape. An example of the material of the substrate 200 is ceramics. In FIG. 6, the upper surface of the substrate 200 is taken as a front surface 201, and the lower surface of the substrate 200 is taken as a back surface 202. The base insulating layer 210 is formed on the substrate 200 so as to cover the front surface 201 of the substrate 200. The base insulating layer 210 is configured of the same non-magnetic material as that of the insulating layer 50 configuring the inductor component 10. The base insulating layer 210 can be formed by, for example, applying a polyimide varnish containing a trifluoromethyl base and silsesquioxane onto the front surface 201 of the substrate 200 by spin coating.

Upon completion of formation of the base insulating layer 210, the process proceeds to the next step S12. At step S12, as depicted in FIG. 6, a pattern insulating layer 211 is formed on the base insulating layer 210. At least an upper portion of the pattern insulating layer 211 in FIG. 6 configures the insulating layer 50 of the inductor component 10. The pattern insulating layer 211 can be formed by, for example, patterning a non-magnetic insulating resin on the base insulating layer 210 by photolithography. In this case, the pattern insulating layer 211 is formed by using a polyimide varnish of the same type as that used for forming the base insulating layer 210.

Figure 7:
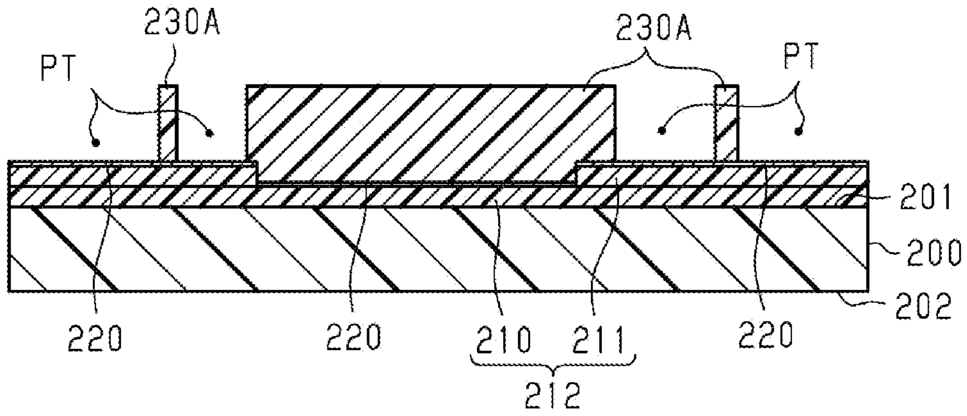
FIG. 7 is a descriptive diagram of the manufacturing method.

Upon completion of formation of the pattern insulating layer 211, the process proceeds to the next step S13. At step S13, a seed layer 220 is formed. That is, as depicted in FIG. 7, the seed layer 220 is formed so as to cover the entire upper surface, in the drawing, of an insulating layer 212 at the time of manufacture, the insulating layer 212 being formed of the base insulating layer 210 and the pattern insulating layer 211. For example, the seed layer 220 containing copper is formed by sputtering. For example, at step S13, the seed layer 220 having a thickness on the order of 200 nm is formed. Part of the seed layer 220 positioned on the pattern insulating layer 211 serves as the wiring seed layer 401 configuring the inductor wire 40.

Upon completion of formation of the seed layer 220, the process proceeds to the next step S14. At step S14, a photoresist is applied onto the entire seed layer 220. The photoresist is applied onto the seed layer 220 by, for example, spin coating. Subsequently, exposure is performed by using an exposure apparatus. This allows a portion of the photoresist corresponding to a position where the conductive layer 402 is formed to be removed by a developing process described further below, and the other portions are cured. When a negative-type resist is adopted as a photoresist, the exposed portion of the photoresist is cured, and the other portions become removable. On the other hand, when a positive-type resist is adopted as a photoresist, the exposed portion of the photoresist becomes removable, and the other portions are cured. By controlling the exposed portion of the photoresist, part of the portions attached onto the insulating layer 212 at the time of manufacture can be cured. Subsequently, by the developing process using a developing solution, as depicted in FIG. 7, the portion of the photoresist corresponding to the position where the conductive layer

402 is formed is removed. Also, the cured portions of the photoresist are left on the seed layer 220 as a first protective film 230A. In this manner, by patterning the first protective film 230A on the seed layer 220, a wiring pattern PT is formed. The wiring pattern PT forms an opening shape in accordance with the shape of the inductor wire 40 of the inductor component 10.

Figure 8:
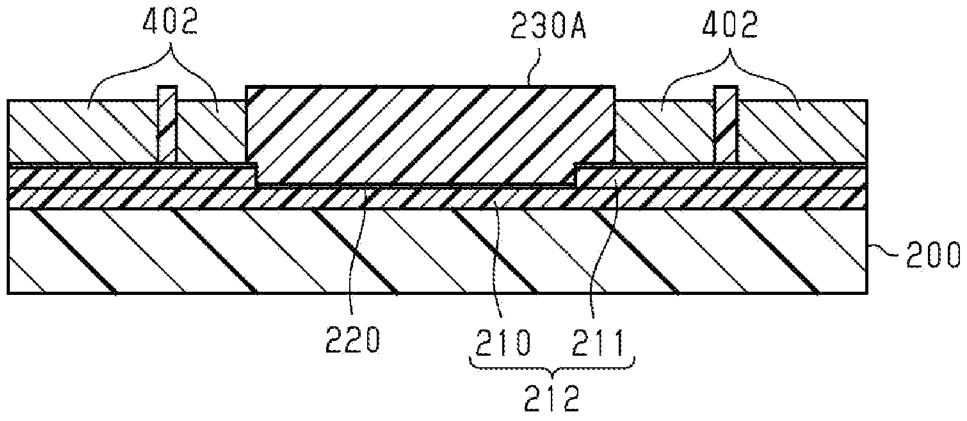
FIG. 8 is a descriptive diagram of the manufacturing method.

Upon ending of formation of the wiring pattern PT, the process proceeds to the next step S15. At step S15, by supplying a conductive material into the wiring pattern PT, the conductive layer 402 as depicted in FIG. 8 is formed. For example, by electrolytic copper plating using a copper sulfate aqueous solution, mainly copper and a subtle amount of sulfur precipitate at an exposed portion of the seed layer 220. With this, the conductive layer 402 is formed. Since the copper sulfate aqueous solution is used, the conductive layer 402 contains sulfur. The inductor wire 40 is formed of a portion of the seed layer 220 in contact with the conductive layer 402 and the conductive layer 402. That is, the portion of the seed layer 220 in contact with the conductive layer 402 serves as the wiring seed layer 401.

Figure 9:
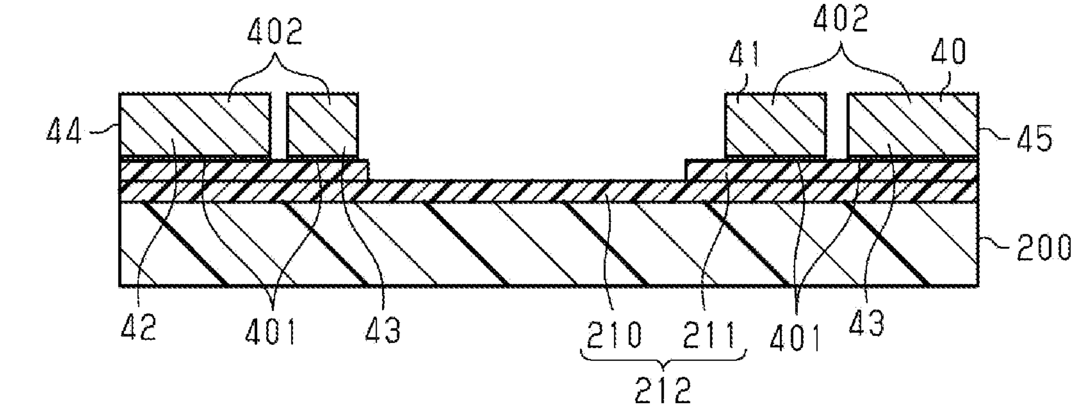
FIG. 9 is a descriptive diagram of the manufacturing method.

Upon completion of formation of the conductive layer 402, the process proceeds to the next step S16. At step S16, by a process using a stripping solution, the first protective film 230A is removed as depicted in FIG. 9. Also, upon completion of removal of the first protective film 230A, a portion of the seed layer 220 in contact with the first protective film 230A is removed. The portion of the seed layer 220 in contact with the first protective film 230A is removed by, for example, wet etching. This makes only a portion of the seed layer 220 serving as the wiring seed layer 401 left.

Figure 10:
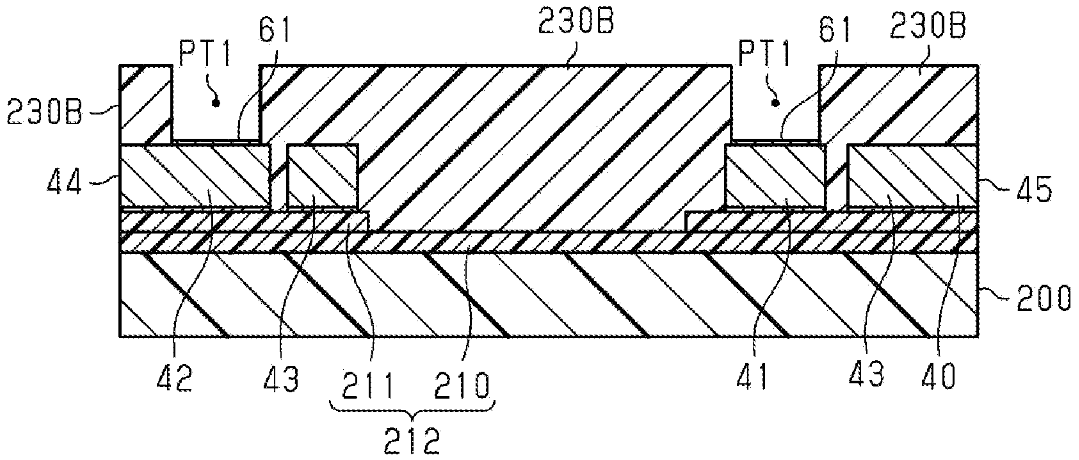
FIG. 10 is a descriptive diagram of the manufacturing method.

Upon completion of the removal process at step S16, the process proceeds to the next step S17. At step S17, a photoresist is applied so as to cover the inductor wire 40. The photoresist is applied by, for example, spin coating. Subsequently, exposure is performed by using the exposure apparatus. This allows a portion of the photoresist corresponding to a position where the first columnar wire 63 is formed to be removed by a developing process described further below, and the other portions are cured. Subsequently, by the developing process using a developing solution, as depicted in FIG. 10, a portion of the photoresist attached onto the pattern insulating layer 211 is removed. Also, the cured portions of the photoresist are left on the insulating layer 212 at the time of manufacture as a second protective film 230B. In this manner, by patterning the second protective film 230B on the insulating layer 212 at the time of manufacture, a first columnar pattern PT1 as a pattern for forming the first columnar wire 63 is formed. The first columnar pattern PT1 forms an opening shape in accordance with the shape of the first columnar wire 63 of the inductor component 10.

Figure 11:
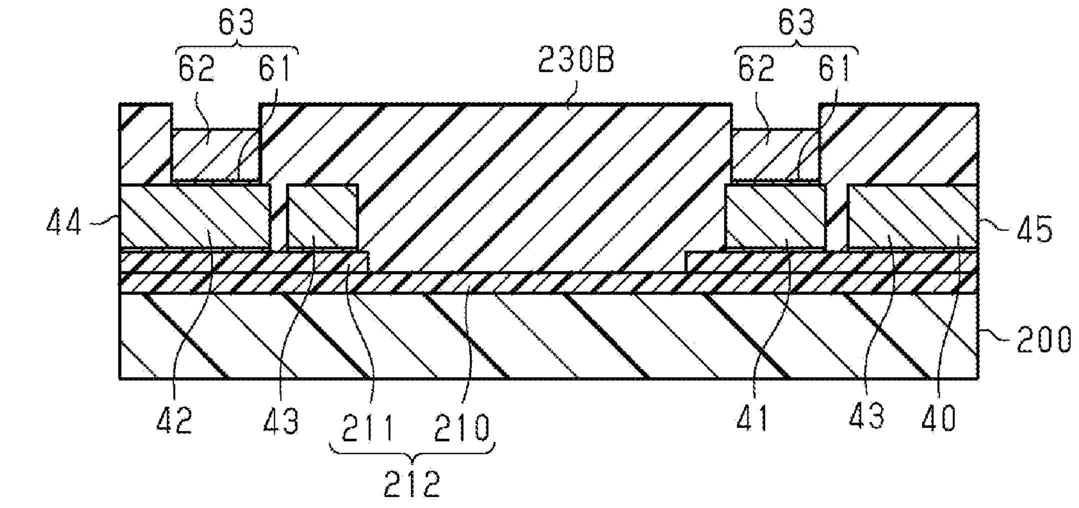
FIG. 11 is a descriptive diagram of the manufacturing method.

Upon ending of formation of the first columnar pattern PT1, the process proceeds to the next step S18. At step S18, as depicted in FIG. 10, the columnar-wire seed layer 61 is formed. For example, the columnar-wire seed layer 61 containing copper is formed by sputtering. For example, at step S13, the columnar-wire seed layer 61 having a thickness on the order of 200 nm is formed. Subsequently, by supplying a conductive material into the first columnar pattern PT1, a conductive first column 62 is formed as depicted in FIG. 11. The first column 62 is formed by, for example, as described above, electrolytic copper plating using a copper sulfate aqueous solution. Since the copper sulfate aqueous solution is used, the first column 62 contains a subtle amount of sulfur. The first column 62 and the columnar-wire seed layer 61 form the first columnar wire 63.

Figure 12:
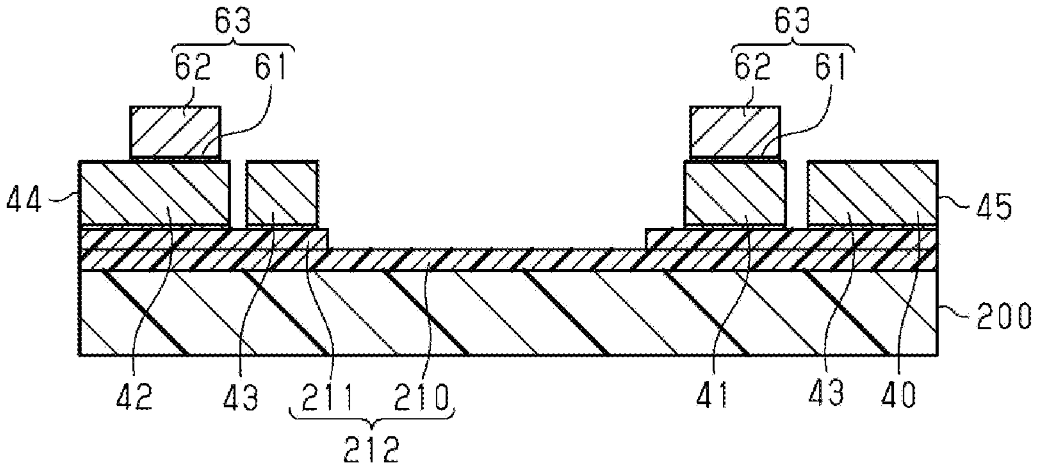
FIG. 12 is a descriptive diagram of the manufacturing method.

Upon completion of formation of the first columnar wire 63, the process proceeds to the next step S19. At step S19, by a process using a stripping solution, the second protective film 230B is removed as depicted in FIG. 12. With the second protective film 230B removed, part of the columnar-wire seed layer 61 may be exposed. Thus, after removal of the second protective film 230B, for example, by wet etching, the exposed portion of the columnar-wire seed layer 61 is removed.

Figure 13:
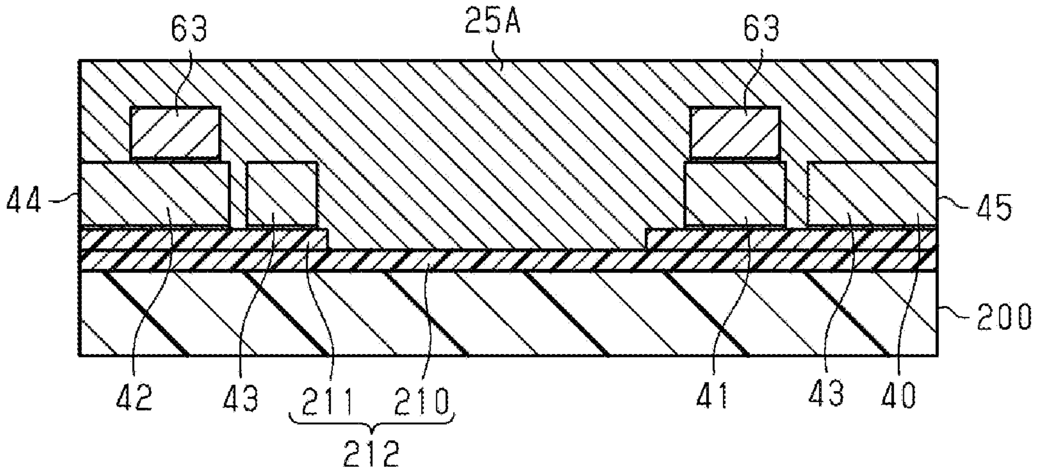
FIG. 13 is a descriptive diagram of the manufacturing method.
Figure 14:
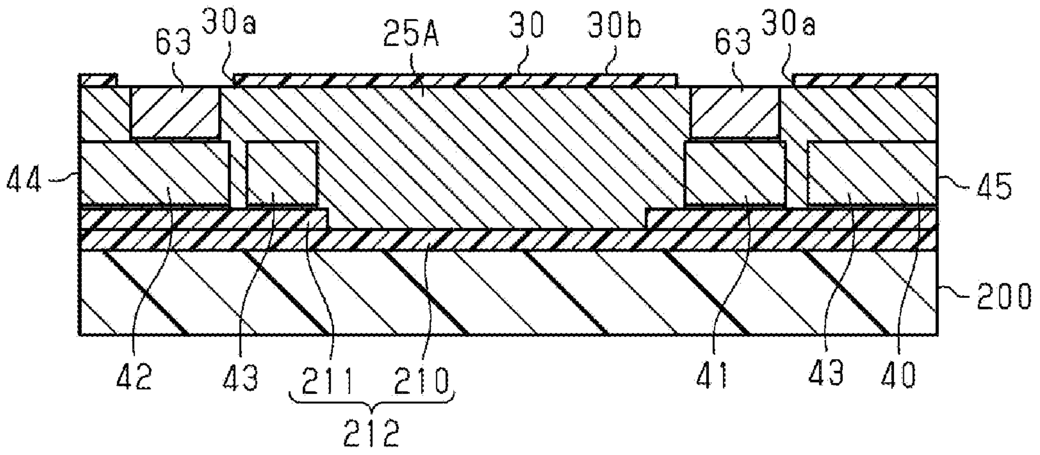
FIG. 14 is a descriptive diagram of the manufacturing method.

Upon completion of the removal process at step S19, the process proceeds to the next step S20. At step S20, a first magnetic sheet 25A depicted in FIG. 13 is pressed from above in the drawing. This causes the inductor wire 40 and the first columnar wire 63 to be buried in the first magnetic sheet 25A. The first magnetic sheet 25A pressed from above in the drawing at step S20 may be a single-layer sheet or a multilayer body with a plurality of layers laminated. Subsequently, as depicted in FIG. 14, the upper side of the first magnetic sheet 25A in the drawing is ground until one end of the first columnar wire 63 not in contact with the inductor wire 40 becomes viewable from above in the drawing.

Upon completion of pressing of the first magnetic sheet 25A and grinding of the first magnetic sheet 25A, the process proceeds to the next step S21. At step S21, as depicted in FIG. 14, the surface layer 30 is formed on the upper surface of the first magnetic sheet 25A in the drawing. The surface layer 30 can be formed by, for example, patterning a non-magnetic insulating resin on the first magnetic sheet 25A by photolithography. Subsequently, a through hole 30*a* is formed at a position of the surface layer 30 where the first external terminal 65 is formed. The through hole 30*a* can be formed by, for example, laser radiation onto the surface layer 30.

Figure 15:
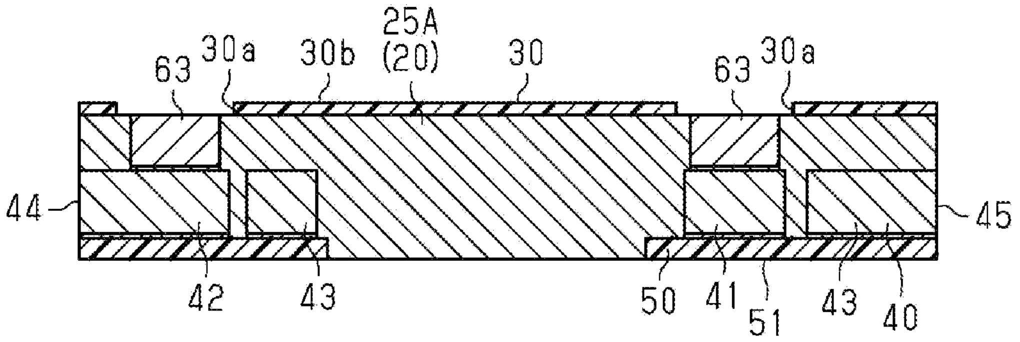
FIG. 15 is a descriptive diagram of the manufacturing method.

Upon completion of formation of the surface layer 30, the process proceeds to the next step S22. At step S22, as depicted in FIG. 15, the substrate 200 and the base insulating layer 210 are removed by grinding. Here, part of the pattern insulating layer 211 may be removed. This process causes the remaining pattern insulating layer 211 to become the insulating layer 50 of the inductor component 10.

Figure 16:
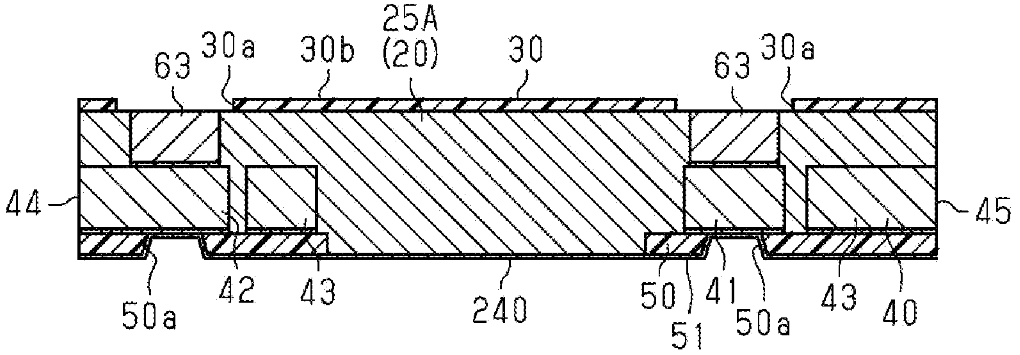
FIG. 16 is a descriptive diagram of the manufacturing method.

Upon completion of grinding, the process proceeds to the next step S23. At step S23, as depicted in FIG. 16, the via hole 50*a* is formed in the insulating layer 50. The via hole 50*a* is formed by, for example, laser radiation onto the insulating layer 50.

Figure 17:
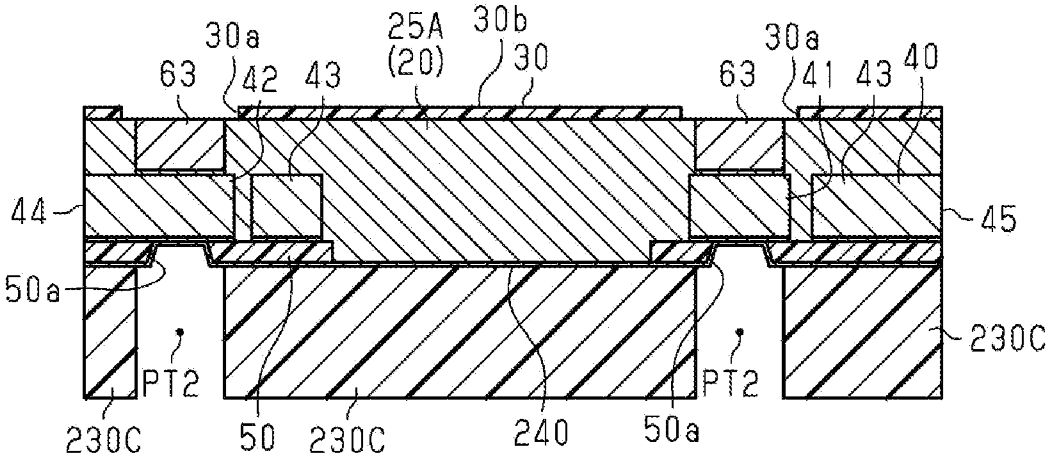
FIG. 17 is a descriptive diagram of the manufacturing method.

Upon completion of formation of the via hole 50*a*, the process proceeds to the next step S24. At step S24, as depicted in FIG. 16, a seed layer 240 is formed on a side of the first magnetic sheet 25A opposite to a side thereof where the surface layer 30 is provided. The seed layer 240 is also referred to as an "opposite-side seed layer 240". For example, the opposite-side seed layer 240 containing copper is formed by sputtering. In this case, copper is attached to both of a surface 51 of the insulating layer 50 positioned opposite to the position of the inductor wire 40 and the peripheral wall of the via hole 50*a*. Subsequently, a photoresist is applied onto the entire opposite-side seed layer 240. The photoresist is applied onto the opposite-side seed layer 240 by, for example, spin coating. Subsequently, exposure is performed by using the exposure apparatus. This allows a portion of the photoresist corresponding to positions where the second electrode wires 70A and 70B are formed to be removed by a developing process described further below, and the other portions are cured. Then, by the developing process using a developing solution, as depicted in FIG. 17, a portion of the photoresist corresponding to the positions where the second electrode wires 70A and 70B are formed is removed. Also, the cured portions of the photoresist are left as a third protective film 230C. In this manner, by patterning the third protective film 230C on the opposite-side seed layer 240, a second columnar pattern PT2 as a pattern for forming the second electrode wires 70A and 70B in the inductor component 10 is formed. The second columnar pattern PT2 forms an opening shape in accordance with the shape of the second columnar wire 72 of the inductor component 10.

Figure 18:
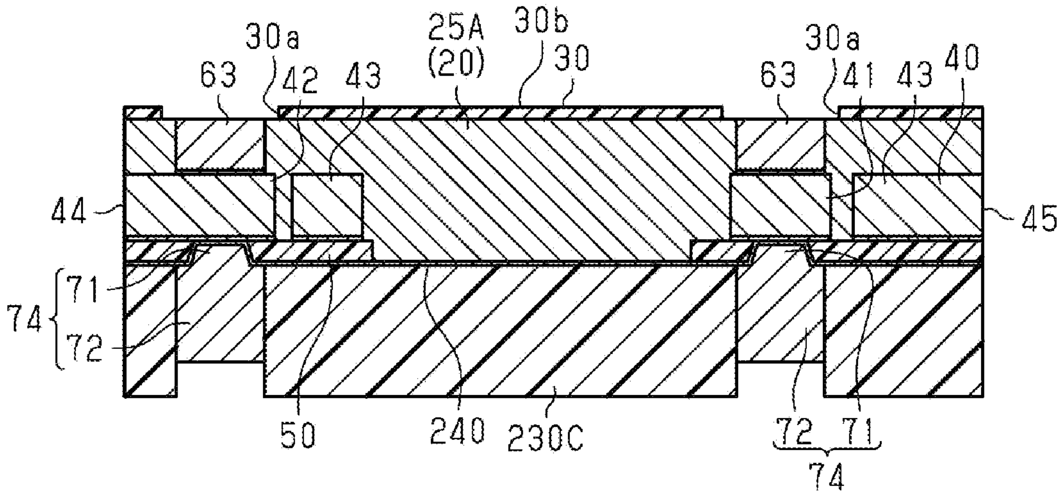
FIG. 18 is a descriptive diagram of the manufacturing method.

Upon ending of formation of the second columnar pattern PT2, the process proceeds to the next step S25. At step S25, by supplying a conductive material into the second columnar pattern PT2, a conductive second column 74 is formed as depicted in FIG. 18. The second column 74 is formed by, for example, as described above, electrolytic copper plating using a copper sulfate aqueous solution. Since the copper sulfate aqueous solution is used, the second column 74 contains sulfur. A portion of the second column 74 positioned in the via hole 50*a* and a portion of the opposite-side seed layer 240 attached onto the peripheral wall of the via hole 50*a* and the insulating layer 50 configure the via 71. A portion of the second column 74 positioned outside the via hole 50*a* serves as the second columnar wire 72. That is, the second electrode wires 70A and 70B are formed.

Figure 19:
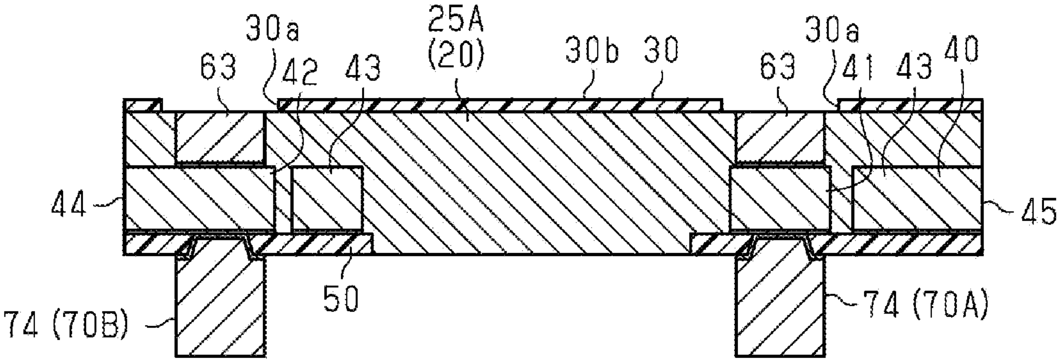
FIG. 19 is a descriptive diagram of the manufacturing method.

Upon completion of formation of the second electrode wires 70A and 70B, the process proceeds to the next step S26. At step S26, by a process using a stripping solution, the third protective film 230C is removed as depicted in FIG. 19. Also, upon completion of removal of the third protective film 230C, a portion of the opposite-side seed layer 240 in contact with the third protective film 230C is removed. The portion of the opposite-side seed layer 240 in contact with the third protective film 230C is removed by, for example, wet etching. This makes only a portion of the opposite-side seed layer 240 configuring the second electrode wires 70A and 70B left.

Figure 20:
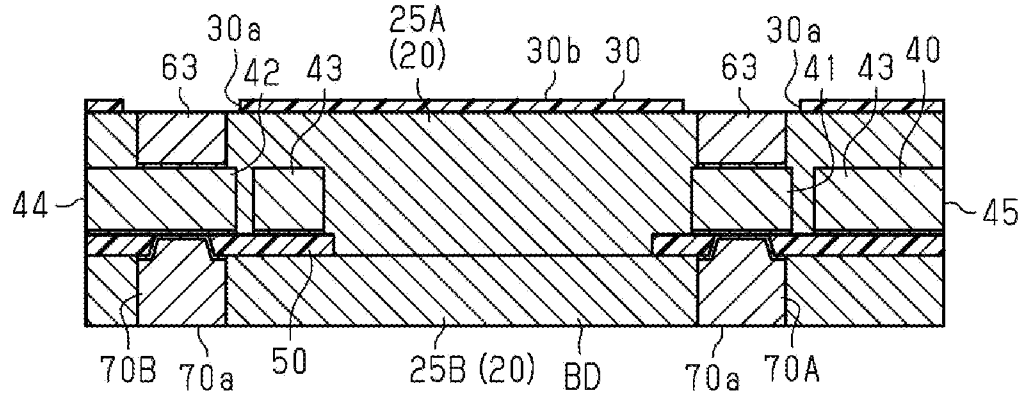
FIG. 20 is a descriptive diagram of the manufacturing method.

Upon completion of the removal process at step S26, the process proceeds to the next step S27. At step S27, as depicted in FIG. 20, a second magnetic sheet 25B is pressed from below in the drawing. This causes the second electrode wires 70A and 70B to be buried in the second magnetic sheet 25B. The second magnetic sheet 25B pressed from below in the drawing at step S27 may be a single-layer sheet or a multilayer body with a plurality of layers laminated. Subsequently, the lower side of the second magnetic sheet 25B in the drawing is ground until one ends of the second electrode wires 70A and 70B not in contact with the inductor wire 40 become viewable from below in the drawing. This configures the main body BD of the inductor component 10. Then, after completion of grinding, the remaining portion of the second column 74 serve as the second electrode wires 70A and 70B.

Figure 21:
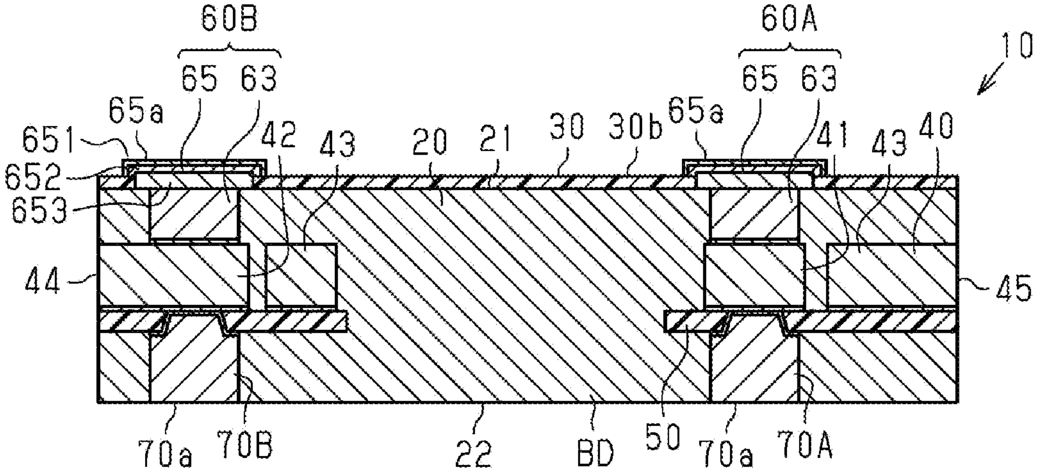
FIG. 21 is a descriptive diagram of the manufacturing method.

Upon completion of pressing of the second magnetic sheet 25B and grinding of the second magnetic sheet 25B, the process proceeds to the next step S28. At step S28, as depicted in FIG. 21, the first external terminal 65 is formed on the surface layer 30. When the first external terminal 65 is a multilayer body, layers 651, 652, and 653 are sequentially formed by, for example, sputtering or electroless plating. Then, upon completion of formation of the first external terminal 65, a series of processes configuring the method of manufacturing the inductor component 10 ends.

The above-described manufacturing method is one example when a single inductor component 10 is manufactured. However, the method of manufacturing the inductor component 10 is not limited to this. For example, portions to serve as a plurality of inductor components 10 may be arranged on the substrate 200 in a matrix shape and made into individual pieces by cutting with a dicing machine or the like at step S28 onward.

Second Embodiment

Figure 22:
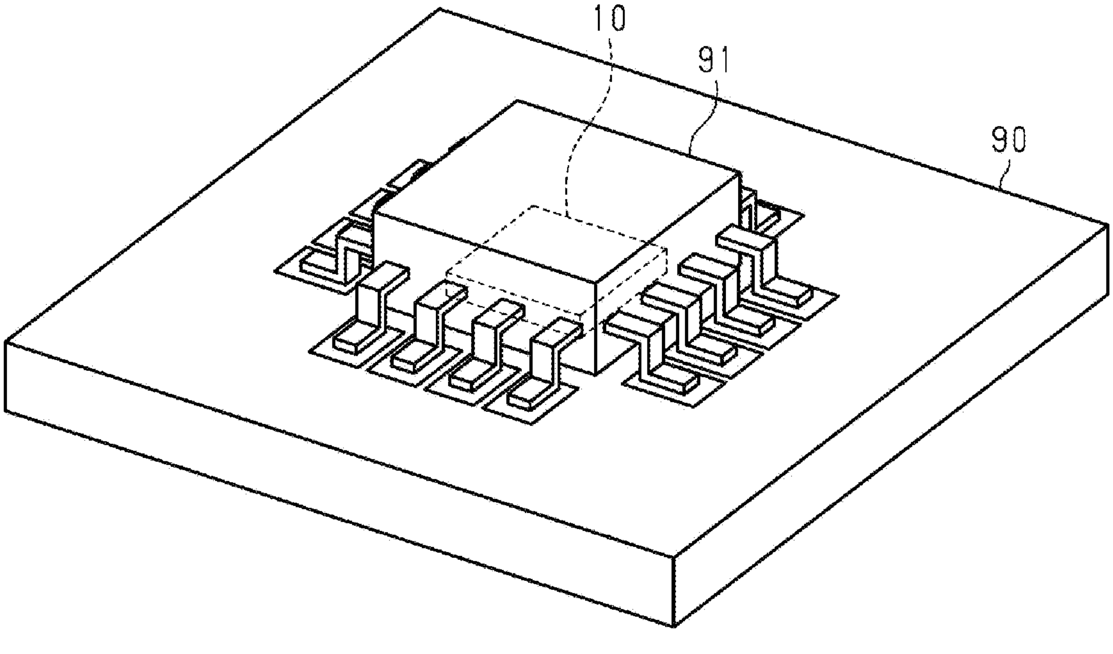
FIG. 22 is a perspective view schematically depicting a resin sealing body and a printed wiring board with the resin sealing body mounted thereon in a second embodiment.
Figure 23:
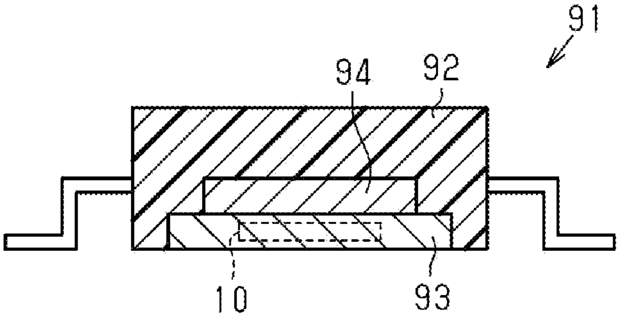
FIG. 23 is a sectional view depicting one example of the resin sealing body.

Next, one embodiment of the resin sealing body is described in accordance with FIG. 22 and FIG. 23. In the following description, portions different from those of the first embodiment are mainly described, and a member or structure identical or corresponding to that of the first embodiment is provided with the same reference character and redundant description is omitted.

FIG. 22 depicts a resin sealing body 91 and a printed wiring board 90 with the resin sealing body 91 mounted thereon. The resin sealing body 91 has incorporated therein the inductor component 10 and a sealing resin 92 sealing the inductor component 10.

As depicted in FIG. 23, the resin sealing body 91 may further include a sub-substrate 93 sealed with the sealing resin 92 and having the inductor component 10 incorporate therein. An example of the sealing resin 92 is an epoxy resin. The resin sealing body 91 depicted in FIG. 23 also includes a chip 94 arranged on the sub-substrate 93. The chip 94 is a semiconductor die. In the resin sealing body 91, the sub-substrate 93 and the chip 94 are covered with the sealing resin 92. That is, the resin sealing body 91 is mounted on the printed wiring board 90, and the sub-substrate 93 and the printed wiring board 90 are different from each other. The resin sealing body 91 is not limited to have the structure in which the inductor component 10 is incorporated in the sub-substrate 93, and the inductor component 10 may be mounted on a chip 94 side (die side) or a printed wiring board 90 side (land side) as main surfaces of the sub-substrate 93.

As described in the first embodiment, the inductor component 10 is a thin component. Therefore, as described above, the inductor component 10 can be buried in the sub-substrate 93 or can be mounted on the chip 94 side or the printed wiring board 90 side of the sub-substrate 93. Also, it is possible to inhibit an increase in dimension of the resin sealing body 91 in a direction (vertical direction in FIG. 23) orthogonal to the mount surface of the printed wiring board 90. That is, the height of the resin sealing body 91 can be reduced.

MODIFICATION EXAMPLES

Each of the above-described embodiments can be modified as follows for implementation. Each of the above-described embodiments and the following modification examples can be implemented as being mutually combined in a technically-consistent range.

The inductor component 10 may be configured not to include the insulating layer 50. In this case, the second electrode wires 70A and 70B are each configured not to have the via 71, and thus the second columnar wire 72 of the second electrode wires 70A and 70B is directly in contact with the inductor wire 40.

The inductor component 10 may be configured so that the insulating layer 50 covers the entire surface of the inductor wire 40 from its upper surface side or the upper surface to the lower surface. In this case, the first electrode wires 60A and 60B are each configured to have a via penetrating through the insulating layer 50. Furthermore, the via and the first columnar wire 63 configure a vertical wire directly in contact with the inductor wire 40.

Figure 24:
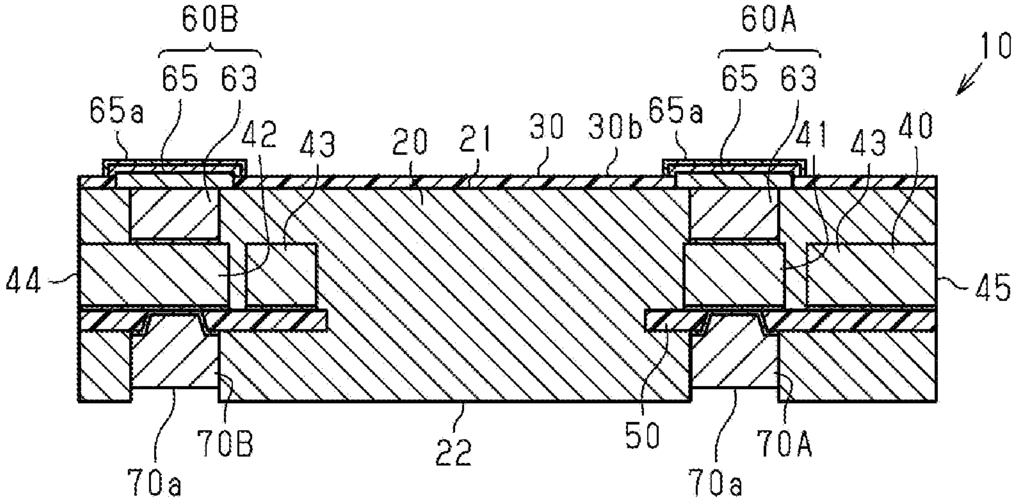
FIG. 24 is a sectional view depicting part of an inductor component of a modification example.

As depicted in FIG. 24, the exposed end face of the second external terminal 70*a* may be positioned between a portion of the inductor wire 40 in contact with the second electrode wires 70A and 70B and the second main surface 22 in the thickness direction X1. That is, the exposed end face of the second external terminal 70*a* may be positioned inside the second main surface 22. In this case, in the inductor component 10, a recess is formed on a second main surface 22 side. When this inductor component 10 is mounted on a substrate, the recess is used for positioning the inductor component 10, thereby allowing the inductor component 10 to be easily positioned.

Figure 25:
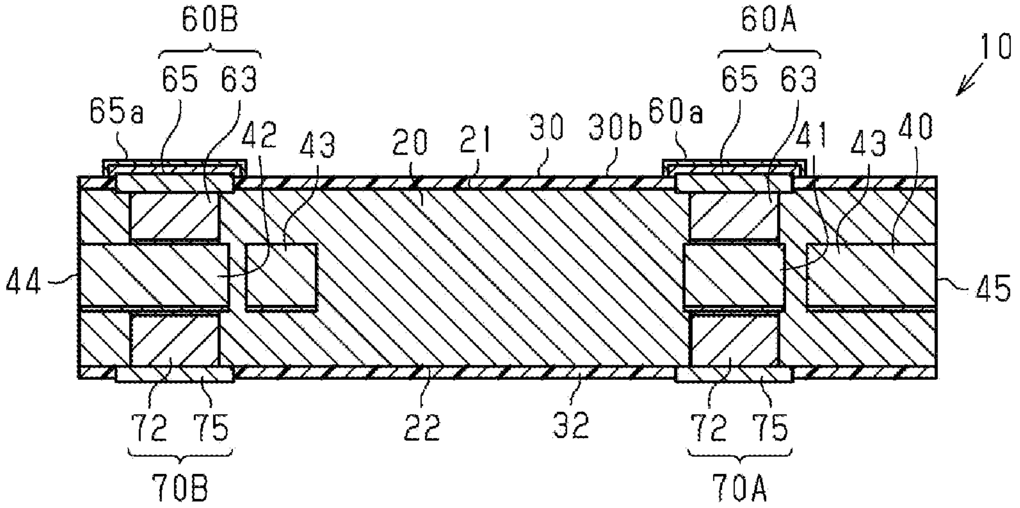
FIG. 25 is a sectional view depicting part of an inductor component of a modification example.

As depicted in FIG. 25, a surface layer 32 with insulation properties may be provided also on a second main surface 22 side of the main body BD. In this case, the second electrode wires 70A and 70B may be each configured to include, as a second external terminal 75, an electrode formed separately from the second columnar wire 72. If the second external terminal 75 contains a metal material not contained in the first external terminal 65, the second external terminal 75 may be configured of the same metal material as that configuring the second columnar wire 72, or may be configured of a metal material different from the metal material configuring the second columnar wire 72.

Also, the second external terminal 75 may be a multilayer body with a plurality of layers laminated. In this case, at least one of the layers configuring the second external terminal 75 is preferably a layer containing a metal not contained in the first external terminal 65.

The second external terminal 75 may contain at least one of copper and a copper alloy. For example, when the second external terminal 75 is formed as a multilayer body, the surface layer of the multilayer body may be a layer containing at least one of copper and a copper alloy. In this case, the second external terminal 75 can be used as an external terminal of an inductor component to be buried in a substrate. As a result, the height of the inductor component can be reduced.

The first external terminal 65 may be configured so that a portion of connection to the first columnar wire 63 is positioned in the main body BD, specifically, inside the first main surface 21. That is, the portion of connection may be positioned between the inductor wire 40 and the first main surface 21 in the thickness direction X1. In this case, the exposed end face 65*a* of the first external terminal 65 may be flush with the first main surface 21.

Similarly, when the second electrode wires 70A and 70B each include the second external terminal 75, the second external terminal 75 may be configured so that a portion of connection to the second column 74 is positioned in the main body BD, specifically, inside the first main surface 21. That is, the portion of connection may be positioned between the inductor wire 40 and the second main surface 22 in the thickness direction X1.

The exposed end face 65*a* of the first external terminal 65 may be flush with the front surface 30*b* of the surface layer 30.

The first external terminal 65 is any configured of a plurality of layers, and may be a multilayer body configured of three or more layers or a multilayer body configured of two layers.

Of the plurality of layers configuring the first external terminal 65, two or more layers may contain nickel or an alloy containing nickel. That is, part of the plurality of layers configuring the first external terminal 65 may be a corrosion inhibiting layer, or each of the plurality of layers configuring the first external terminal 65 may be a corrosion inhibiting layer.

The multilayer body of the first external terminal 65 may have a layer containing all of copper, nickel, gold, and tin.

The multilayer body of the first external terminal 65 may have a layer containing all of an alloy containing copper, an alloy containing nickel, an alloy containing gold, and an alloy containing tin.

The first external terminal 65 may not be a multilayer body.

The first external terminal of the first electrode wires 60A and 60B may not be the first external terminal 65 configured of a multilayer body. In this case, of both end portions of the first columnar wire 63, an end portion different from the end portion in contact with the inductor wire 40 serves as the first external terminal.

The inductor wire may have a shape different from the shape described in each of the embodiments. The structure, shape, material, and so forth of the inductor wire are not particularly limited as long as the inductor wire can apply inductance to the inductor component by generating a magnetic flux around a current when it flows. The inductor wire may be a wire in any of various known wire shapes, such as a substantially spiral shape with one turn or more, a substantially curved shape with turns less than 1.0 turn, and a winding, substantially meandering shape.

Figure 26:
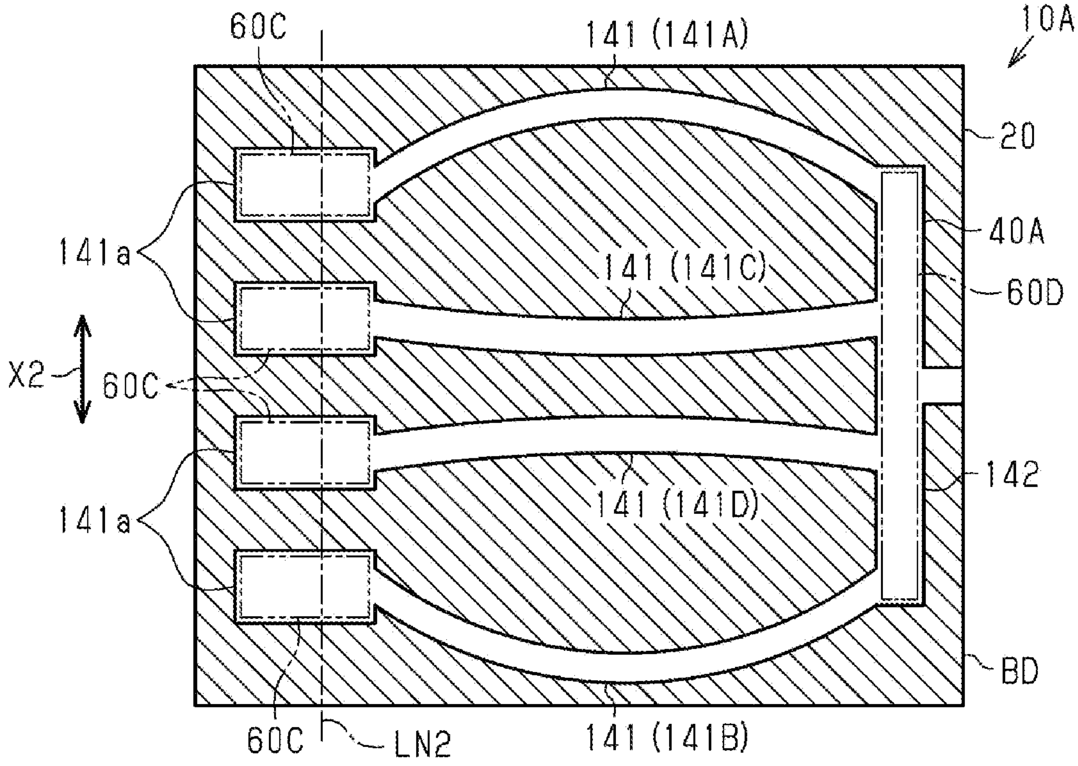
FIG. 26 is a schematic view depicting an inductor wire included in an inductor component of a modification example.
Figure 27:
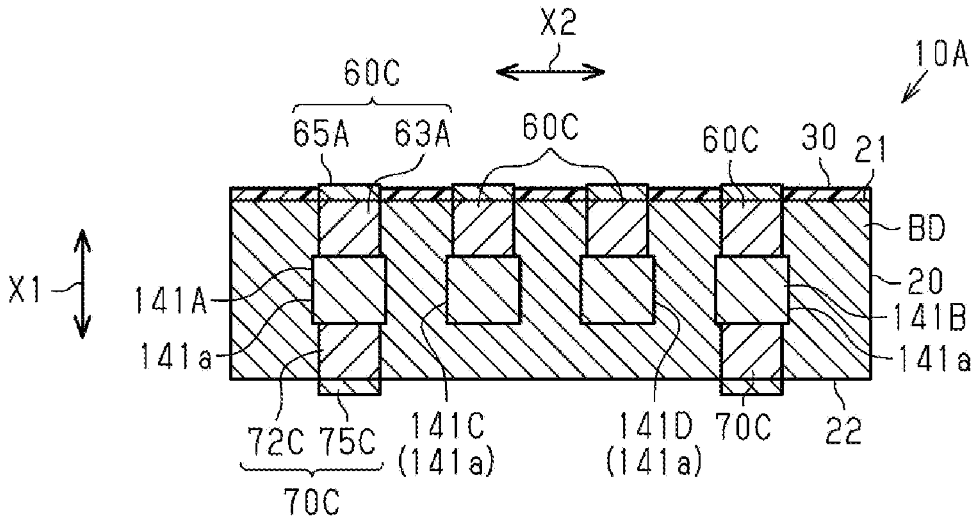
FIG. 27 is a sectional view of the inductor component of the modification example.

For example, the inductor component may be such that, as depicted in FIG. 26, an inductor wire 40A is provided in the main body BD. FIG. 27 is a sectional view obtained when an inductor component 10A depicted in FIG. 26 is cut out along a direction orthogonal to a line LN2 indicated by a one-dot-chain line in FIG. 26. The inductor wire 40A has a plurality of individual wire portions 141 arranged along the width direction X2 and a coupling wire portion 142 linking each of the individual wire portions 141. Also, as depicted in FIG. 27, the inductor component 10A includes, for each individual wire portion 141, a first electrode wire 60C in contact with a pad 141*a* of the individual wire portion 141. Also, the inductor component 10A includes a first electrode wire 60D in contact with the coupling wire portion 142. Each of the first electrode wires 60C and 60D has a first columnar wire 63A and a first external terminal 65A. The first external terminal 65A is, for example, a multilayer body with a layer containing copper, a layer containing nickel, and a layer containing gold laminated. The first external terminal 65A may be of a single layer if the layer contains a metal not contained in a second external terminal 75C.

Also, as depicted in FIG. 27, the inductor component 10A includes two second electrode wires 70C in contact with two individual wire portions 141A and 141B of the individual wire portions 141, the individual wire portions 141A and 141B being positioned outside in the width direction X2. In the example depicted in FIG. 27, the second electrode wire 70C includes a second columnar wire 72C and the second external terminal 75C. The second external terminal 75C has, for example, a layer containing copper. The second external terminal 75C may be a multilayer body with a plurality of layers laminated.

The inductor component 10A depicted in FIG. 27 is not provided with the second electrode wire in contact with individual wire portions 141C and 141D of the individual wire portions 141, the individual wire portions 141C and 141D being positioned inside in the width direction X2. However, this is not meant to be restrictive. For example, the second electrode wire 70C in contact with the individual wire portion 141C may be provided, or the second electrode wire 70C in contact with the individual wire portion 141D may be provided. Also, for example, if the second electrode wire 70C in contact with the individual wire portion 141C is provided, the first electrode wire 60C in contact with the individual wire portion 141C may not be provided. Similarly, if the second electrode wire 70C in contact with the individual wire portion 141D is provided, the first electrode wire 60C in contact with the individual wire portion 141D may not be provided.

Figure 28:
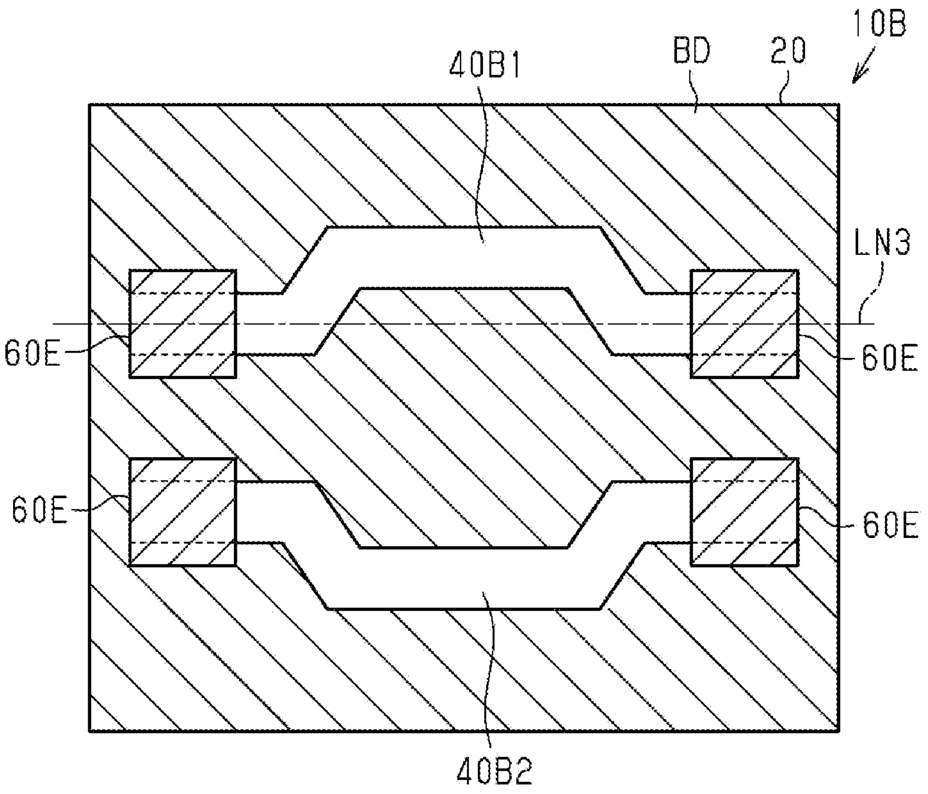
FIG. 28 is a sectional view of an inductor component of a modification example.
Figure 29:
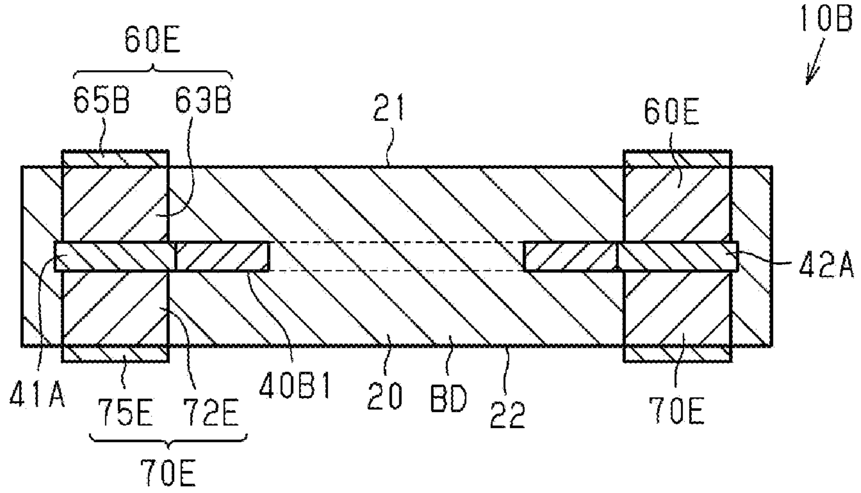
FIG. 29 is a sectional view of the inductor component of the modification example.

The inductor component may be configured with a plurality of inductor wires not in contact with each other provided in the main body BD. FIG. 28 and FIG. 29 depict one example of an inductor component 10B with a plurality of inductor wires 40B1 and 40B2 provided in the main body BD. FIG. 29 is a sectional view obtained when the inductor component 10B depicted in FIG. 28 is cut out along a direction orthogonal to a line LN3 indicated by a one-dot-chain line in FIG. 28. In the main body BD of the inductor component 10B, the plurality of inductor wires 40B1 and 40B2 are away from each other. Thus, of the inductor wires 40B1 and 40B2, in the first inductor wire 40B1, a first electrode wire 60E and a second electrode wire 70E are in contact with a first end portion 41A, and the first electrode wire 60E and the second electrode wire 70E are in contact with a second end portion 42A. Also, of the inductor wires 40B1 and 40B2, in the second inductor wire 40B2, the first electrode wire 60E and the second electrode wire 70E are in contact with the first end portion 41A, and the first electrode wire 60E and the second electrode wire 70E are in contact with the second end portion 42A.

In the example depicted in FIG. 29, the first electrode wire 60E has a first columnar wire 63B and a first external terminal 65B. The first external terminal 65B is, for example, a multilayer body with a layer containing copper, a layer containing nickel, and a layer containing gold laminated. The first external terminal 65B may be of a single layer if the layer contains a metal not contained in a second external terminal 75E. Also in the example depicted in FIG. 29, the second electrode wire 70E includes a second columnar wire 72E and the second external terminal 75E. The second external terminal 75E has, for example, a layer containing copper. The second external terminal 75E may be a multilayer body with a plurality of layers laminated.

In the inductor wires 40B1 and 40B2, if the first electrode wire 60E is in contact with the first end portion 41A, the second electrode wire 70E in contact with the first end portion 41A may not be provided. Conversely, if the second electrode wire 70E is in contact with the first end portion 41A, the first electrode wire 60E in contact with the first end portion 41A may not be provided.

Also, in the inductor wires 40B1 and 40B2, of the first electrode wire 60E and the second electrode wire 70E, if only the first electrode wire 60E is in contact with the first end portion 41A, only the second electrode wire 70E of the first electrode wire 60E and the second electrode wire 70E may be in contact with the second end portion 42A.

Furthermore, in the structure in which the plurality of inductor wires 40B1 and 40B2 are provided in the main body BD, consider a case in which, of the inductor wires 40B1 and 40B2, the electrode wires are in contact with the first end portion 41A and the second end portion 42A in the first inductor wire 40B1. In this case, of the inductor wires 40B1 and 40B2, the electrode wires may be in contact with portions different from the first end portion 41A and the second end portion 42A in the second inductor wire 40B2 different from the first inductor wire 40B1.

The inductor component may be manufactured by another method not using a semi-additive method. For example, the inductor component may be manufactured by using a sheet lamination method, a printing lamination method, or the like. The inductor wires may be formed by a thin-film method such as sputtering or vapor deposition, a thick-film method such as printing or coating, or a plating method such as a full-additive method or subtractive method.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a main body including a magnetic layer and having a first main surface and a second main surface;

an inductor wire provided in the main body and having a wire main body extending between an outer peripheral end portion and an inner peripheral end portion which is positioned on an inner side than the outer peripheral end portion in a radial direction, the inductor wire having a first pad in contact with the inner peripheral end portion and a second pad in contact with the outer peripheral end portion;

at least one first electrode wire provided in the main body and in contact with the inductor wire and extending from a portion of contact with the inductor wire toward the first main surface; and at least one second electrode wire provided in the main body and in contact with the inductor wire and extending from a portion of contact with the inductor wire toward the second main surface, wherein the second main surface is positioned opposite to the first main surface across the inductor wire, in each of the at least one first electrode wire and the at least one second electrode wire, when an end portion opposite to an end portion in contact with the inductor wire is taken as an external terminal, the external terminal is exposed outside, and the external terminal of the at least one first electrode wire contains a metal material different from a metal material contained in the external terminal of the at least one second electrode wire, the at least one first electrode wire includes a plurality of first electrode wires, and the plurality of first electrode wires include first electrode wires in contact with the first pad and the second pad of the inductor wire, respectively, the at least one second electrode wire includes a plurality of second electrode wires, and the plurality of second electrode wires include second electrode wires in contact with the first pad and the second pad of the inductor wire, respectively, the inductor wire includes a dummy wire, the main body further includes first and second side surfaces connecting the first and second main surfaces and being positioned opposite to each other, the outer peripheral end portion is positioned closer to the first side surface than the second side surface, and the dummy wire is directly connected to the wire main body and extends from the wire main body towards the second side surface and is exposed on the second side surface, and the wire main body, the first pad, the second pad, and the dummy wire are arranged on a predetermined plane.

2. The inductor component according to claim 1, wherein when the external terminal of the at least one first electrode wire is a first external terminal, the at least one first electrode wire has a vertical wire directly in contact with the inductor wire and, of both end portions of the vertical wire, an end portion opposite to an end portion in contact with the inductor wire is connected to the first external terminal, the first external terminal is a multilayer body in which a plurality of layers are laminated, and at least one layer of the plurality of layers of the first external terminal is a corrosion inhibiting layer.

3. The inductor component according to claim 2, wherein the multilayer body has a layer containing at least one of copper, nickel, gold, or tin.

4. The inductor component according to claim 2, wherein the multilayer body has at least two layers among a layer containing copper, a layer containing nickel, a layer containing gold, or a layer containing tin.

5. The inductor component according to claim 2, wherein the first external terminal protrudes from the first main surface.

6. The inductor component according to claim 2, further comprising:

a surface layer with insulation properties provided on the first main surface, and the first external terminal protrudes from the surface layer.

7. The inductor component according to claim 2, wherein a portion of the first external terminal connected to the vertical wire is positioned inside the first main surface.

8. The inductor component according to claim 1, wherein when the external terminal of the at least one second electrode wire is a second external terminal, the second external terminal contains at least one of copper or a copper alloy.

9. The inductor component according to claim 1, wherein when the external terminal of the at least one second electrode wire is a second external terminal, an exposed end face of the second external terminal is positioned inside the second main surface.

10. The inductor component according to claim 1, wherein at least one of the first electrode wire or the second electrode wire is in contact with a first end of the inductor wire, and at least one of the first electrode wire or the second electrode wire is in contact with a second end of the inductor wire.

11. The inductor component according to claim 1, further comprising:

an insulating layer provided in the main body and in contact with the inductor wire.

12. The inductor component according to claim 1, wherein a distance between the first main surface and the second main surface is from 0.15 mm to 0.3 mm.

13. A resin sealing body comprising:

the inductor component according to claim 1; and a sealing resin which seals the inductor component.

14. The resin sealing body according to claim 13, further comprising:

a sub-substrate sealed by the sealing resin and having the inductor component incorporated therein.

15. The inductor component according to claim 3, wherein the first external terminal protrudes from the first main surface.

16. The inductor component according to claim 3, further comprising:

a surface layer with insulation properties provided on the first main surface, and the first external terminal protrudes from the surface layer.

17. The inductor component according to claim 3, wherein a portion of the first external terminal connected to the vertical wire is positioned inside the first main surface.

18. The inductor component according to claim 2, wherein when the external terminal of the at least one second electrode wire is a second external terminal, the second external terminal contains at least one of copper or a copper alloy.

19. The inductor component according to claim 1, wherein the first pad, the second pad, and the dummy wire are positioned along a line intersecting the first and second side surfaces.

* * * * *